(12) United States Patent
Watanabe et al.

(10) Patent No.: US 12,259,601 B2
(45) Date of Patent: Mar. 25, 2025

(54) LIGHT SHAPING DEVICE AND LIGHT SHAPING METHOD

(71) Applicant: HAMAMATSU PHOTONICS K.K., Hamamatsu (JP)

(72) Inventors: Koyo Watanabe, Hamamatsu (JP); Naoya Matsumoto, Hamamatsu (JP); Hisanari Takahashi, Hamamatsu (JP); Kyohei Shigematsu, Hamamatsu (JP); Takashi Inoue, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 884 days.

(21) Appl. No.: 17/370,468

(22) Filed: Jul. 8, 2021

(65) Prior Publication Data

US 2022/0019094 A1 Jan. 20, 2022

(30) Foreign Application Priority Data

Jul. 14, 2020 (JP) .................. 2020-120895

(51) Int. Cl.
*G02F 1/01* (2006.01)

(52) U.S. Cl.
CPC .......... *G02F 1/0105* (2013.01); *G02F 1/0121* (2013.01); *G02F 2203/26* (2013.01)

(58) Field of Classification Search
CPC ... G02F 1/0105; G02F 1/0121; G02F 2203/26
See application file for complete search history.

(56) References Cited

U.S. PATENT DOCUMENTS

| | | | |
|---|---|---|---|
| 6,327,068 B1 | 12/2001 | Silberberg et al. | |
| 2018/0348549 A1* | 12/2018 | Watanabe | ................. G02F 1/13 |

FOREIGN PATENT DOCUMENTS

| | | |
|---|---|---|
| CN | 108539573 | 9/2018 |
| JP | H10-223959 A | 8/1998 |
| JP | 2002-139716 A | 5/2002 |
| JP | 2013-178374 A | 9/2013 |
| JP | 2016-218141 A | 12/2016 |

* cited by examiner

*Primary Examiner* — Joseph P Martinez
(74) *Attorney, Agent, or Firm* — Faegre Drinker Biddle & Reath LLP

(57) ABSTRACT

Provided is a light shaping device including: an intensity modulation unit that modulates a spectrum intensity of an optical pulse that is input light, and outputs the optical pulse of which a temporal width is narrowed as output light. The intensity modulation unit modulates the spectrum intensity of the optical pulse with a mask expressed by a starting end wavelength from a central wavelength of the input light and a wavelength width.

24 Claims, 24 Drawing Sheets

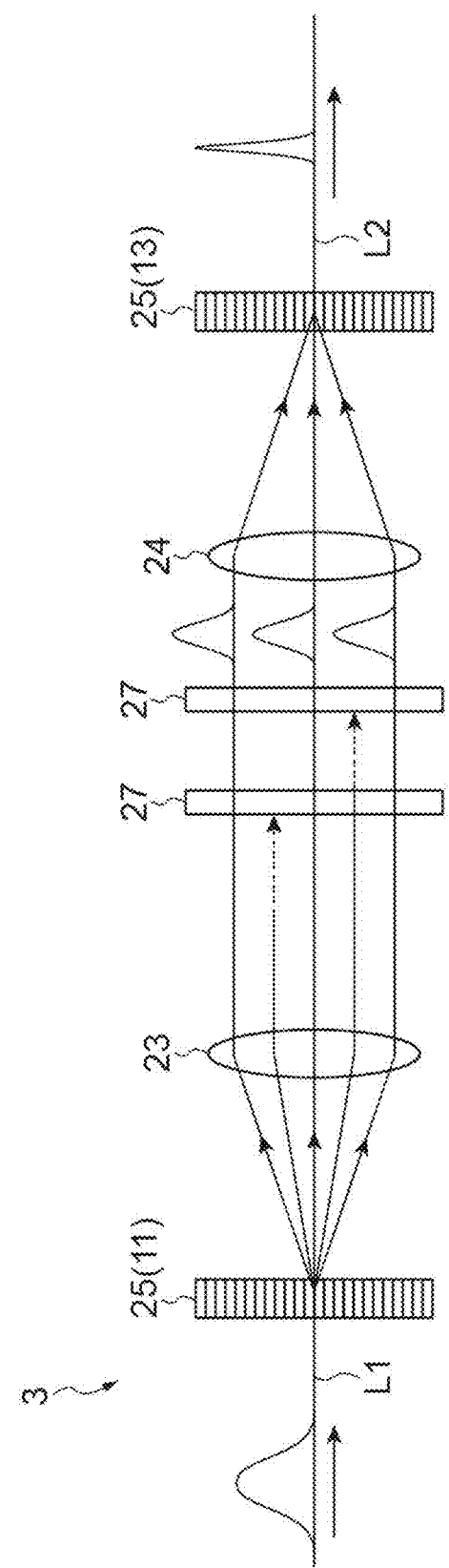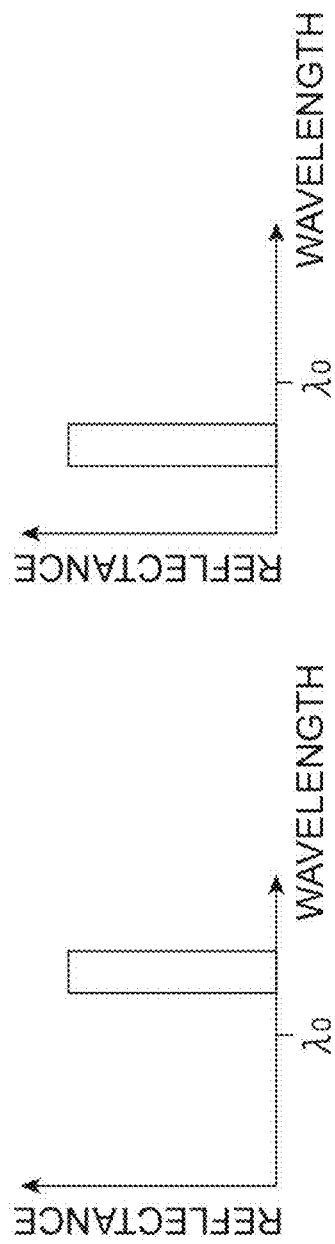

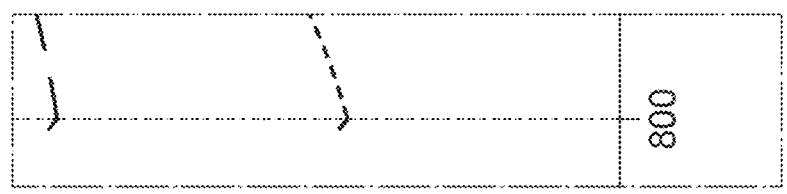
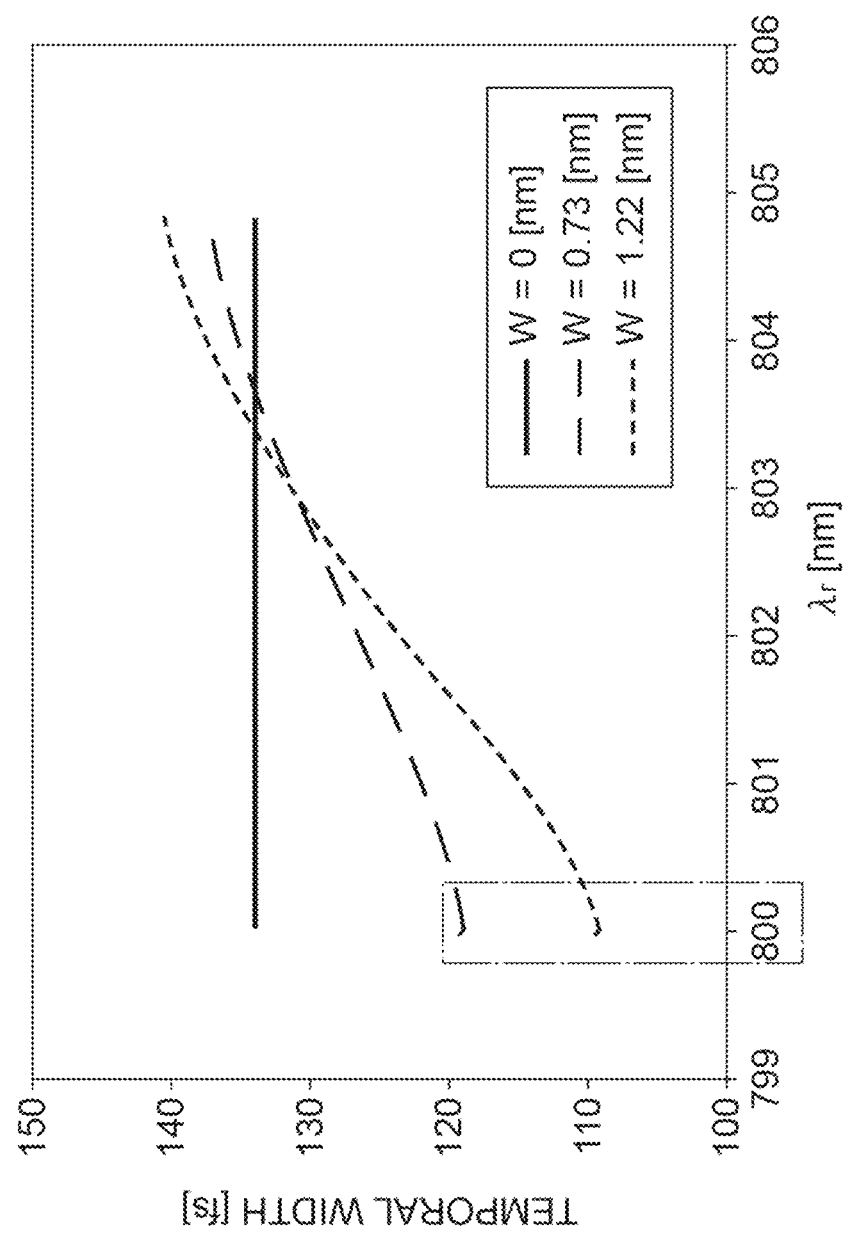

LIGHT SHAPING DEVICE AND LIGHT SHAPING METHOD

TECHNICAL FIELD

The present disclosure relates to a light shaping device and a light shaping method.

BACKGROUND

In recent years, research and development of a light shaping technology for narrowing a temporal width of an optical pulse have been in progress. The optical pulse (for example, an ultrashort optical pulse) of which the temporal width is narrowed by using the light shaping technology is applied to a wide range of applications such as laser processing, terahertz wave generation and measurement, and a laser microscope system. It is considered that further narrowing of the temporal width contributes to an improvement of performance in respective applications. Examples of this kind of technology include a light control device described in Patent Literature 1 (Japanese Unexamined Patent Publication No. 2016-218141). In the light control device described in this Patent Literature 1, an intensity spectrum of an optical pulse that is input is modulated by a spatial light modulator. In the modulation of the intensity spectrum of the optical pulse, a modulation pattern that is presented to the spatial light modulator is calculated, and a time intensity waveform of the optical pulse is shaped to a desired waveform.

SUMMARY

In the light control device described in the above-mentioned Patent Literature 1, due to optimization of the modulation pattern presented to the spatial light modulator, an intensity pattern that varies continuously with respect to a wavelength is obtained. In the light control device, narrowing of the temporal width by approximately 15% is realized by allowing approximately 60% of intensity loss. In anticipation of an increase in applications of the optical pulse of which the temporal width is narrowed by using the light shaping technology, and industrial revitalization accompanies the increase in applications, a technology capable of further improving a temporal width narrowing rate with respect to the intensity loss of the optical pulse at low cost is desired.

The present disclosure has been made to solve the problem, and an object thereof is to provide a light shaping device and a light shaping method which are capable of improving a temporal width narrowing rate with respect to an intensity loss of an optical pulse at low cost.

According to an aspect of the present disclosure, there is provided a light shaping device including: an intensity modulation unit configured to modulate a spectrum intensity of an optical pulse that is input light, and to output the optical pulse of which a temporal width is narrowed as output light. The intensity modulation unit modulates the spectrum intensity of the input light with a mask expressed by a starting end wavelength $\lambda r$ and a wavelength width W from the starting end wavelength $\lambda r$.

The light shaping device modulates the spectrum intensity of the input light with the mask expressed by the starting end wavelength $\lambda r$ and the wavelength width W from the starting end wavelength $\lambda r$. According to this, narrowing of a temporal width exceeding a theoretical limit in the case of modulating a spectrum phase becomes possible, and a temporal width narrowing rate with respect to an intensity loss of the optical pulse can be improved. In addition, parameters of the mask are relatively simple, and continuous or high-accuracy intensity modulation with respect to each spectrum component is not necessary. Accordingly, it is possible to construct the intensity modulation unit without introducing an expensive intensity modulator. As a result, a reduction in cost of the light shaping device can be realized.

The mask may be set to be symmetrical with respect to a central wavelength of the input light. When using such a mask, the temporal width narrowing rate with respect to the intensity loss of the optical pulse can be further improved.

The light shaping device may further include a calculation unit configured to calculate setting values of the starting end wavelength $\lambda r$ and the wavelength width W of the mask that is used in the intensity modulation unit on the basis of an allowable value of at least one of an intensity loss rate and a temporal width narrowing rate of the output light. In this case, the calculation unit performs optimal setting of the mask in consideration of the intensity loss rate and the narrowing rate. Accordingly, convenience of the light shaping device can be improved.

The calculation unit may calculate the setting values of the starting end wavelength $\lambda r$ and the wavelength width W of the mask that is used in the intensity modulation unit on the basis of an allowable value of at least one of a peak intensity and an appearance time region of a side lobe of the output light. In this case, the calculation unit performs optimal setting of the mask in consideration of the side lobe. Accordingly, convenience of the light shaping device can be further improved.

The calculation unit may calculate a setting number of the mask that is used in the intensity modulation unit on the basis of an allowable value of at least one of the peak intensity and the appearance time region of the side lobe of the output light. In this case, the calculation unit performs optimal setting of the mask in consideration of the side lobe. Accordingly, convenience of the light shaping device can be further improved.

The calculation unit may calculate a power magnification of the input light for compensating a peak intensity of the output light on the basis of setting values of the starting end wavelength $\lambda r$ and the wavelength width W of the mask that is used in the intensity modulation unit. In this case, the peak intensity of the output light can be compensated in a level that is equivalent to a case where intensity modulation using the mask is not performed.

The intensity modulation unit may include a demultiplexing element configured to demultiplex the input light for every wavelength, an intensity modulation element configured to cut a predetermined spectrum component in the input light that is demultiplexed by the demultiplexing element, and a multiplexing element configured to multiplex spectrum components output from the intensity modulation element. In this case, the intensity modulation unit that modulates the spectrum intensity of the input light can be realized in a simple configuration.

The intensity modulation element may be constituted by a spatial light modulator. In this case, the mask can be formed dynamically and in a higher degree of freedom due to a phase pattern that is presented to the spatial light modulator.

The intensity modulation element may be constituted by a shielding plate. In this case, the mask can be formed in a simple configuration, and a further reduction in cost of the light shaping device can be realized.

The intensity modulation element may be constituted by one or a plurality of dielectric multi-layer film minor. In this case, the mask can be formed in a simple configuration, and a further reduction in cost of the light shaping device can be realized.

The intensity modulation unit may be constituted by one or a plurality of dielectric multi-layer film mirrors. In this case, the mask can be formed in a simple configuration, and a further reduction in cost of the light shaping device can be realized.

According to another aspect of the present disclosure, there is provided a light shaping method including: modulating a spectrum intensity of an optical pulse that is input light, and outputting the optical pulse of which a temporal width is narrowed as output light. In the modulating, the spectrum intensity of the input light is modulated with a mask expressed by a starting end wavelength λr and a wavelength width W from the starting end wavelength λr.

In the light shaping method, the spectrum intensity of the input light is modulated with the mask expressed by the starting end wavelength λr and the wavelength width W from the starting end wavelength λr. According to this, narrowing of a temporal width exceeding a theoretical limit in the case of modulating a spectrum phase becomes possible, and a temporal width narrowing rate with respect to an intensity loss of the optical pulse can be improved. In addition, parameters of the mask are relatively simple, and continuous or high-accuracy intensity modulation with respect to each spectrum component is not necessary. Accordingly, it is possible to perform narrowing of the temporal width of the optical pulse without introducing an expensive intensity modulator. As a result, a reduction in cost of the light shaping can be realized.

In the modulating, the mask may be set to be symmetrical with respect to a central wavelength of the input light. When using such a mask, the temporal width narrowing rate with respect to the intensity loss of the optical pulse can be further improved.

The light shaping method may further include calculating setting values of the starting end wavelength λr and the wavelength width W of the mask that is used in the modulating on the basis of an allowable value of at least one of an intensity loss rate and a temporal width narrowing rate of the output light. In this case, in the calculation step, optimal setting of the mask is performed in consideration of the intensity loss rate and the narrowing rate. Accordingly, convenience of the light shaping can be improved.

In the calculating, the setting values of the starting end wavelength λr and the wavelength width W of the mask that is used in the modulating may be calculated on the basis of an allowable value of at least one of a peak intensity and an appearance time region of a side lobe of the output light. In this case, in the calculation step, optimal setting of the mask is performed in consideration of the side lobe. Accordingly, convenience of the light shaping can be further improved.

In the calculating, a setting number of the mask that is used in the modulating may be calculated on the basis of an allowable value of at least one of the peak intensity and the appearance time region of the side lobe of the output light. In this case, in the calculation step, optimal setting of the mask is performed in consideration of the side lobe. Accordingly, convenience of the light shaping can be further improved.

In the calculating, a power magnification of the input light for compensating a peak intensity of the output light may be calculated on the basis of setting values of the starting end wavelength λr and the wavelength width W of the mask that is used in the modulating. In this case, the peak intensity of the output light can be compensated in a level that is equivalent to a case where intensity modulation using the mask is not performed.

In the intensity modulating, the spectrum intensity of the input light may be modulated by using a demultiplexing element configured to demultiplex the input light for every wavelength, an intensity modulation element configured to cut a predetermined spectrum component in the input light that is demultiplexed by the demultiplexing element, and a multiplexing element configured to multiplex spectrum components output from the intensity modulation element. In this case, the intensity modulation step of modulating the spectrum intensity of the input light can be performed in a simple configuration.

A spatial light modulator may be used as the intensity modulation element. In this case, the mask can be formed dynamically and in a higher degree of freedom due to a phase pattern that is presented to the spatial light modulator.

A shielding plate may be used as the intensity modulation element. In this case, the mask can be formed in a simple configuration, and a further reduction in cost of the light shaping can be realized.

One or a plurality of dielectric multi-layer film mirrors may be used as the intensity modulation element. In this case, the mask can be formed in a simple configuration, and a further reduction in cost of the light shaping can be realized.

In the modulating, the spectrum intensity of the input light may be modulated by using one or a plurality of dielectric multi-layer film mirrors. In this case, the mask can be formed in a simple configuration, and a further reduction in cost of the light shaping device can be realized.

According to the present disclosure, the pulse width narrowing rate with respect to the intensity loss of the optical pulse can be improved at low cost.

BRIEF DESCRIPTION OF THE DRAWINGS

FIG. 8A is a schematic view illustrating still another example of the configuration of the intensity modulation unit.

FIG. 8B is a view showing reflection characteristics of a dielectric multi-layer film mirror on one side.

FIG. 8C is a view showing reflection characteristics of a dielectric multi-layer film mirror on the other side.

FIG. 11A is a view showing a variation of a temporal width of output light in a case where parameters of a mask are changed.

FIG. 11B is a view showing a result near a central wavelength in FIG. 11A in an enlarged manner.

DETAILED DESCRIPTION

Hereinafter, a preferred embodiment of a light shaping device and a light shaping method according to an aspect of the present disclosure will be described in detail with reference to the accompanying drawings.

Schematic Configuration of Light Shaping Device

Figure 1:
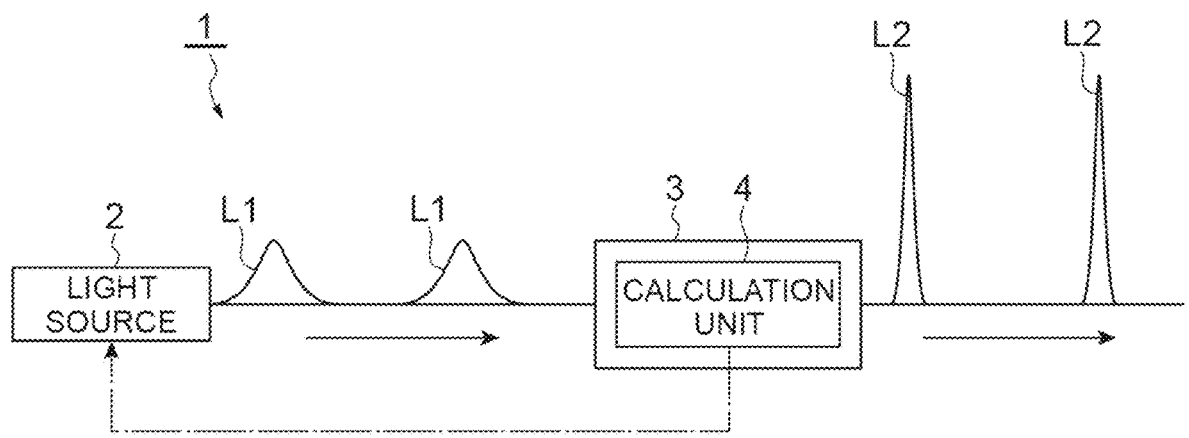
FIG. 1 is a schematic view illustrating a configuration of a light shaping device according to an aspect of the present disclosure.

FIG. 1 is a view illustrating a schematic configuration of the light shaping device according to an aspect of the present disclosure. As illustrated in the same drawing, a light shaping device 1 includes a light source 2, an intensity modulation unit 3 that is optically connected to the light source 2, and a calculation unit 4 that calculates modulation conditions in the intensity modulation unit 3. For example, the light source 2 is a laser light source called a solid laser light source, and outputs coherent pulse light as input light L1 to the intensity modulation unit 3. The intensity modulation unit 3 modulates a spectrum intensity of an optical pulse that is the input light L1, and outputs the optical pulse of which a temporal width is narrowed as output light L2.

Figure 2B:
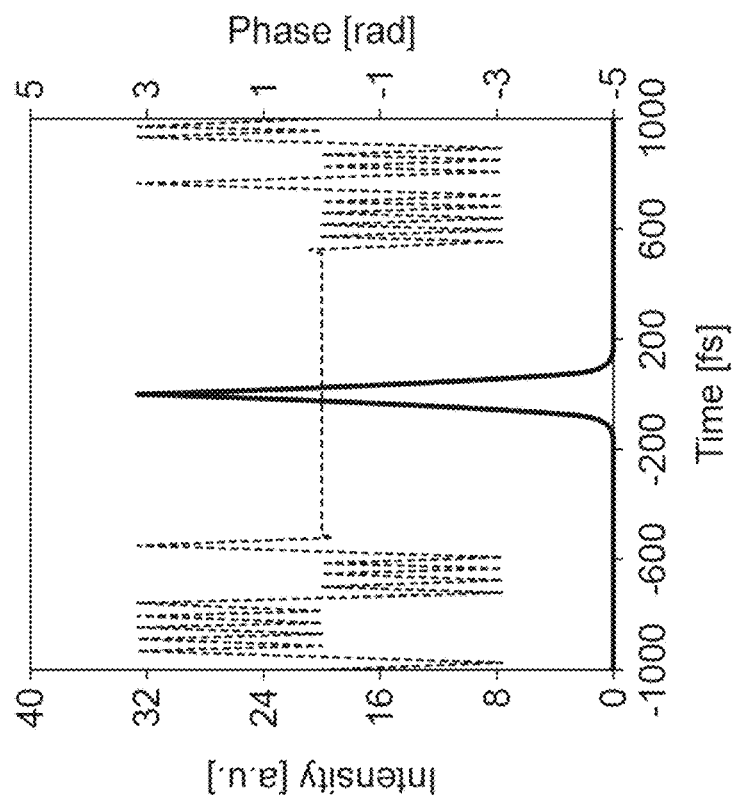
FIG. 2B is a view showing a temporal waveform corresponding to the spectrum waveform shown in FIG. 2A.
Figure 2A:
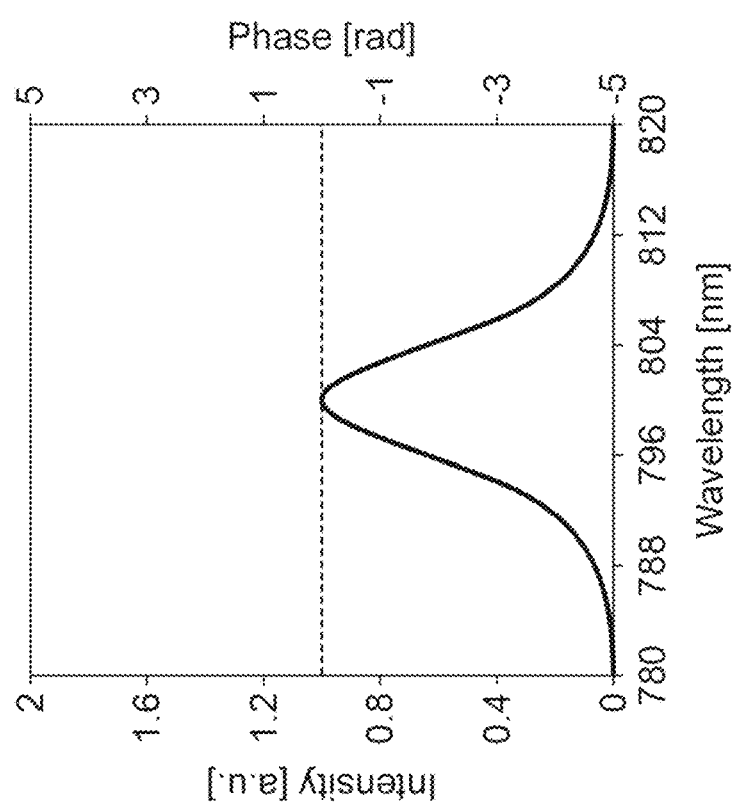
FIG. 2A is a view showing an example of a spectrum waveform having a Gaussian shape.
Figure 3B:
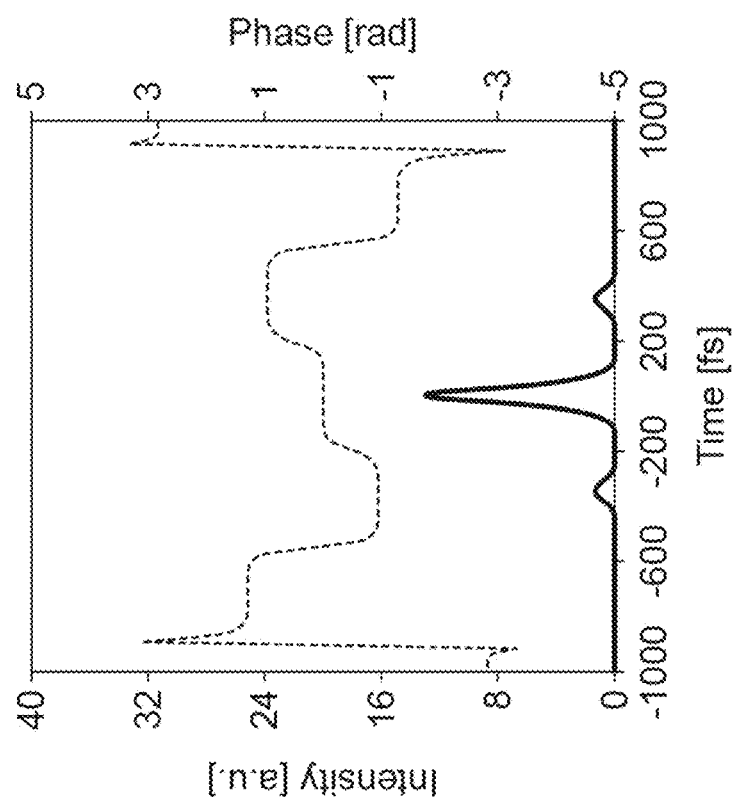
FIG. 3B is a view showing a temporal waveform corresponding to the spectrum waveform shown in FIG. 3A.
Figure 3A:
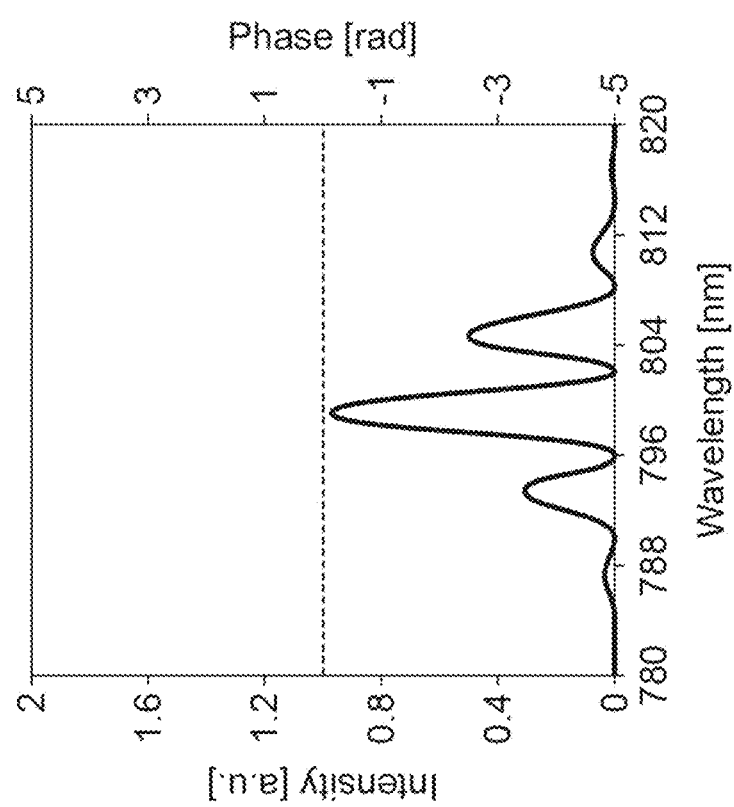
FIG. 3A is a view showing a waveform obtained by applying cosine-like modulation to the spectrum waveform shown in FIG. 2A.

A spectrum waveform of the optical pulse and a temporal waveform are associated with each other in a Fourier transform relationship. For example, FIG. 2A is a view showing an example of a spectrum waveform having a Gaussian shape, and FIG. 2B is a view showing a temporal waveform corresponding to the spectrum waveform. In addition, FIG. 3A is a view showing a waveform obtained by applying cosine-like modulation to the spectrum waveform shown in FIG. 2A, and FIG. 3B is a view showing a temporal waveform corresponding to the spectrum waveform. As shown in the drawings, when at least one of a phase and an intensity of the spectrum waveform varies, the temporal waveform also varies in correspondence with the variation.

Figure 4:
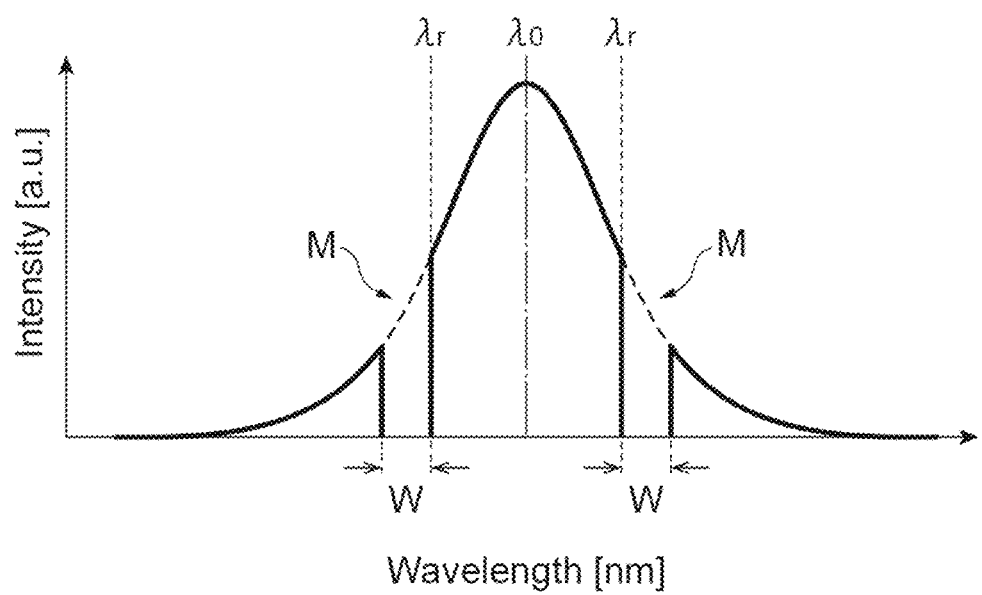
FIG. 4 is a view showing a mask (single mask) that can be used in an intensity modulation unit.

Light shaping in the intensity modulation unit 3 uses the Fourier transform relationship. In the light shaping, when a mask (filtering) M is applied to the spectrum waveform of the input light L1, an improvement of a temporal width narrowing rate with respect to an intensity loss of the optical pulse is realized at low cost. FIG. 4 is a view showing a mask that can be used in the intensity modulation unit. As shown in the same drawing, the mask M is expressed by two parameters including a starting end wavelength λr and a wavelength width W from the starting end wavelength λr. In FIG. 4, the mask M is set to be symmetrical with respect to a central wavelength λ0 of the input light L1.

Here, the starting end wavelength λr is defined as a wavelength on a side, which is close to the central wavelength λ0, between both ends in a wavelength range expressed by a wavelength width W. In addition, the wavelength width W is defined with the starting end wavelength λr set as a reference. In a mask M on a long wavelength side in comparison to the central wavelength λ0, an end on a short wavelength side in the wavelength range of the mask M becomes the starting end wavelength λr, and a terminating end wavelength becomes λr+W. In a mask M on a short wavelength side in comparison to the central wavelength λ0, an end on a long wavelength side in the wavelength range of the mask M becomes the starting end wavelength λr, and the terminating end wavelength becomes λr−W. In FIG. 4, a pair of masks (single masks) symmetrical with respect to the central wavelength λ0 is shown, but a setting number of the mask M is not limited thereto, and a plurality of pairs of masks (multi masks) symmetrical with respect to the central wavelength λ0 may be set.

Returning to FIG. 1, the calculation unit 4 is constituted by, for example, a computer system including a processor, a memory, and the like. Examples of the computer system include a PC, a microcomputer, a cloud server, and a smart device (smartphone, a tablet terminal, or the like). The calculation unit 4 may be constituted by a programmable logic controller (PLC), or an integrated circuit such as a field-programmable gate array (FPGA).

The calculation unit 4 calculates setting values of the starting end wavelength λr and the wavelength width W of the mask M that is used in the intensity modulation unit 3 on the basis of an allowable value of at least one of an intensity loss rate and a temporal width narrowing rate of the output light L2. For example, the allowable value of the intensity loss rate and the temporal width narrowing rate is acquired by accepting an input from a user of the light shaping device 1 with an input unit such as a keyboard. A relationship between the starting end wavelength λr and the wavelength width W, and the intensity loss rate and the temporal width narrowing rate will be described later.

In addition, the calculation unit 4 calculates setting values of the starting end wavelength λr and the wavelength width W of the mask M that is used in the intensity modulation unit 3, and a setting number of the mask M on the basis of an allowable value of at least one of a peak intensity and an appearance time region of a side lobe of the output light L2. The side lobe is high order light that appears on both sides of a main pulse in pulse light (refer to FIG. 16). A relationship between the setting values of the starting end wavelength λr and the wavelength width W and the setting number of the mask M, and the peak intensity and the appearance time region of the side lobe of the output light L2 will be described later.

In addition, the calculation unit 4 may calculate a power magnification of the input light L1 for compensating the peak intensity of the output light L2 on the basis of a calculation result of the setting values of the starting end wavelength λr and the wavelength width W of the mask M that is used in the intensity modulation unit 3. In the aspect of FIG. 1, the calculation unit 4 and the light source 2 are connected to each other in a communication possible manner, and a control signal for controlling power of the input light L1 on the basis of the calculation result of the power magnification of the input light L1 in the calculation unit 4 is output from the calculation unit 4 to the light source 2.

Configuration Example of Intensity Modulation Unit

Figure 5:
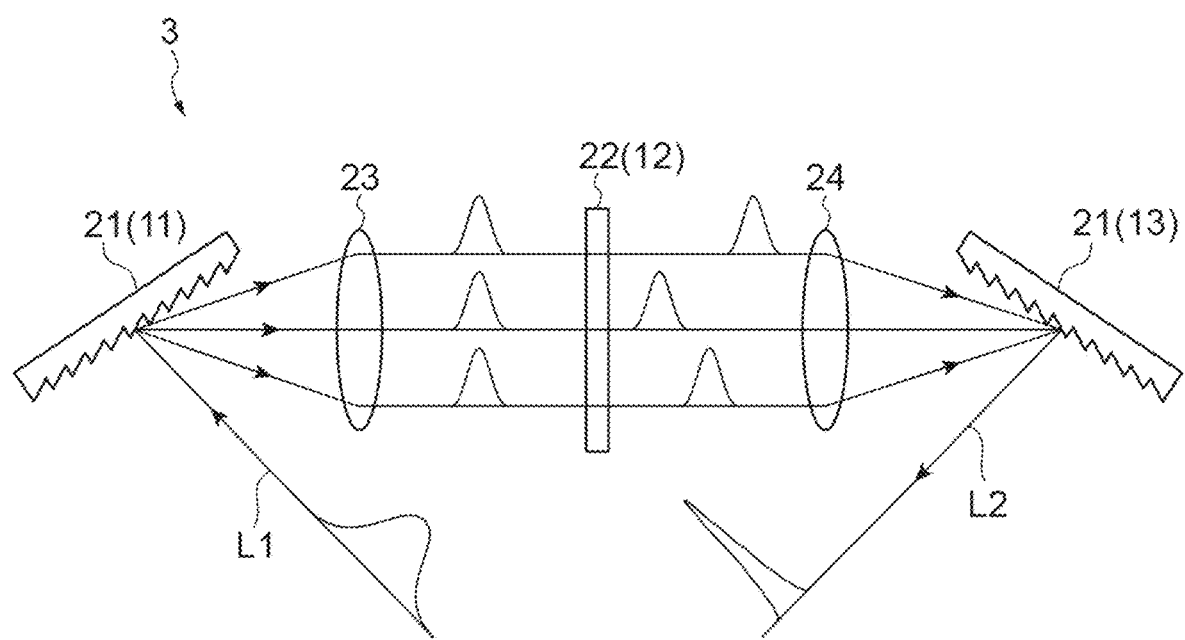
FIG. 5 is a schematic view illustrating an example of a configuration of the intensity modulation unit.

FIG. 5 is a schematic view illustrating an example of a configuration of the intensity modulation unit. As illustrated in FIG. 5, the intensity modulation unit 3 includes a demultiplexing element 11 that demultiplexes the input light L1 for every wavelength, an intensity modulation element 12 that cuts a predetermined spectrum component in the input light L1 that is demultiplexed by the demultiplexing element 11, and a multiplexing element 13 that multiplexes a spectrum component that is output from the intensity modulation element 12.

As the demultiplexing element 11 and the multiplexing element 13, for example, a diffraction grating, a prism, a grism, or the like can be used. The diffraction grating may be any of a reflection type diffraction grating and a transmission type diffraction grating, and may be combined with a lens or the like as necessary. In addition, the demultiplexing element 11 and the multiplexing element 13 may be configured by combining a fiber bragg grating and a lens. In this case, a fiber input and output type intensity modulation unit 3 can be configured. As the intensity modulation element 12, for example, a spatial light modulator (SLM), a shielding plate, a dielectric multi-layer film mirror, or the like can be used.

In an example illustrated in FIG. 5, the demultiplexing element 11 and the multiplexing element 13 are constituted by a reflection type diffraction grating 21, and the intensity modulation element 12 is constituted by a spatial light modulator 22. The input light L1 that is reflected by the reflection type diffraction grating 21 that is the demultiplexing element 11 becomes parallel light by a lens 23, and is incident to the spatial light modulator 22. For example, the spatial light modulator 22 is a phase modulation type spatial light modulator. The spatial light modulator 22 cuts a spectrum component corresponding to the mask M by presenting a predetermined diffraction grating pattern to a phase modulation plane.

The diffraction grating pattern presented to the phase modulation plane of the spatial light modulator 22 is calculated by a modulation pattern calculation device (not illustrated). For example, the modulation pattern calculation device is electrically connected to the calculation unit 4, and on the basis of a calculation result of setting values of the starting end wavelength λr and the wavelength width W of the mask M in the calculation unit 4, the modulation pattern calculation device calculates a diffraction grating pattern corresponding to the calculation result. Light of which intensity is modulated by the spatial light modulator 22 is condensed to a lens 24, and is multiplexed into the output light L2 by the reflection type diffraction grating 21 that is the multiplexing element 13. The output light L2 is pulse light of which a temporal width is further narrowed in comparison to the input light L1.

Figure 6:
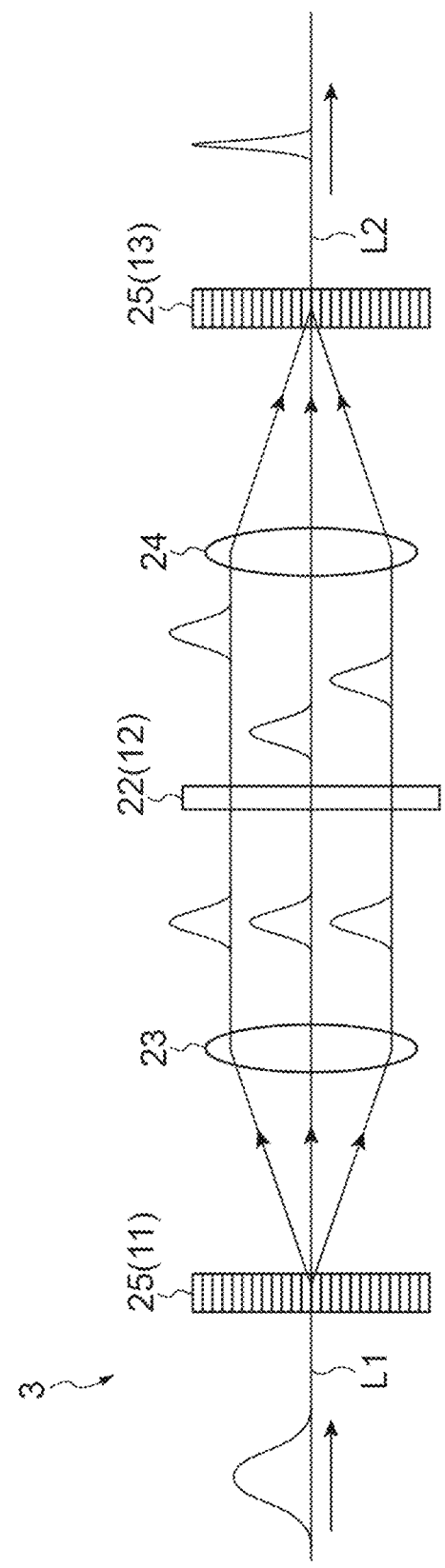
FIG. 6 is a schematic view illustrating another example of the configuration of the intensity modulation unit.

FIG. 6 is a schematic view illustrating another example of the configuration of the intensity modulation unit. The example illustrated in the same drawing is different from the aspect in FIG. 5 in that the demultiplexing element 11 and the multiplexing element 13 are constituted by a transmission type diffraction grating 25. Even in this aspect, a spectrum component corresponding to the mask M is cut by presenting a predetermined diffraction grating pattern to the phase modulation plane of the spatial light modulator 22. Accordingly, pulse light of which a temporal width is further narrowed in comparison to the input light L1 can be obtained as the output light L2.

Figure 7:
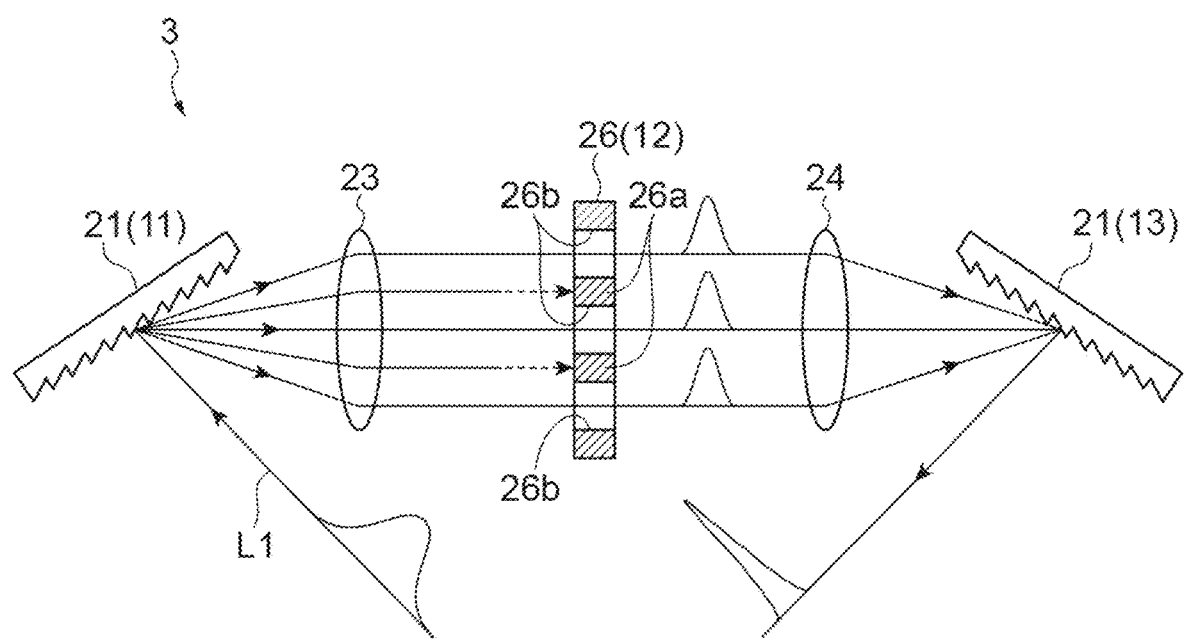
FIG. 7 is a schematic view illustrating still another example of the configuration of the intensity modulation unit.

FIG. 7 is a schematic view illustrating still another example of the configuration of the intensity modulation unit. In the example illustrated in the same drawing, the demultiplexing element 11 and the multiplexing element 13 are constituted by the reflection type diffraction grating 21, and the intensity modulation element 12 is constituted by a shielding plate 26. The shielding plate 26 is provided with a shielding part 26a that shields light, and a passing part 26b through which light is transmitted in a predetermined pattern. A spectrum component corresponding to the mask M is cut by the shielding part 26a, and thus pulse light of which a temporal width is further narrowed in comparison to the input light L1 can be obtained as the output light L2. In this aspect, for example, a plurality of shielding plates 26 in which patterns of the shielding part 26a and the passing part 26b are different from each other are prepared in advance, and setting values of the starting end wavelength λr and the wavelength width W of the mask M, and a setting number of the mask M can be changed by switching the shielding plates 26 disposed on an optical path of the input light L1 by a switching unit.

FIG. 8A is a schematic view illustrating still another example of the configuration of the intensity modulation unit. In the example illustrated in FIG. 8A, the demultiplexing element 11 and the multiplexing element 13 are constituted by the transmission type diffraction grating 25, and the intensity modulation element 12 is constituted by one or a plurality of (here, two) dielectric multi-layer film mirrors 27. The dielectric multi-layer film mirrors 27 function as a so-called band-stop filter. As shown in FIG. 8B, the dielectric multi-layer film mirror 27 on one side has high reflectance in a band corresponding to the starting end wavelength λr and the wavelength width W on a longer wavelength side in comparison to the central wavelength a of input light. In addition, as shown in FIG. 8C, the dielectric multi-layer film mirror 27 on the other side has a high reflectance in a band corresponding to the starting end wavelength λr and the wavelength width W on a shorter wavelength side in comparison to the central wavelength λ0 of the input light.

A spectrum component corresponding to the mask M is cut by the dielectric multi-layer film mirrors 27, and thus pulse light of which a temporal width is further narrowed in comparison to the input light L1 can be obtained as the output light L2. In this aspect, for example, a plurality of the dielectric multi-layer film mirrors 27 in which reflection bands are different are prepared in advance, and the setting values of the starting end wavelength λr and the wavelength width W of the mask M, and the setting number of the mask M can be changed by switching the dielectric multi-layer film mirrors 27 disposed on an optical path of the input light L1 by a switching unit.

Figure 9:
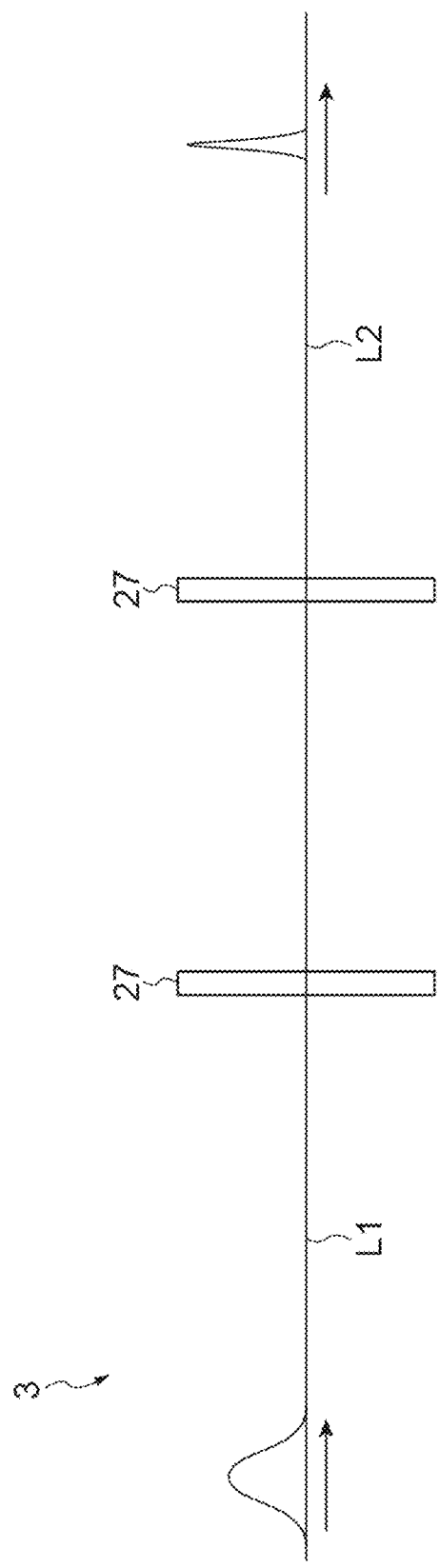
FIG. 9 is a schematic view illustrating still another example of the configuration of the intensity modulation unit.

FIG. 9 is a schematic view illustrating still another example of the configuration of the intensity modulation unit. The example illustrated in the same drawing is different form the aspect illustrated in FIG. 5 to FIG. 7, and FIG. 8A in that the intensity modulation unit 3 is constituted by only one or a plurality of (here, two) dielectric multi-layer film mirrors 27. Even in this aspect, a spectrum component corresponding to the mask M is cut by the dielectric multi-layer film mirrors 27, and thus pulse light of which a temporal width is further narrowed in comparison to the input light L1 can be obtained as the output light L2. Note that, for example, reflection bands of the two dielectric multi-layer film mirrors 27 are the same as shown in FIG. 8B and FIG. 8C. The configuration in which the dielectric multi-layer film mirrors 27 disposed on the optical path of the input light L1 are switched by the switching unit is also the same as in the case of FIG. 8A.

Operation of Light Shaping Device

Figure 10:
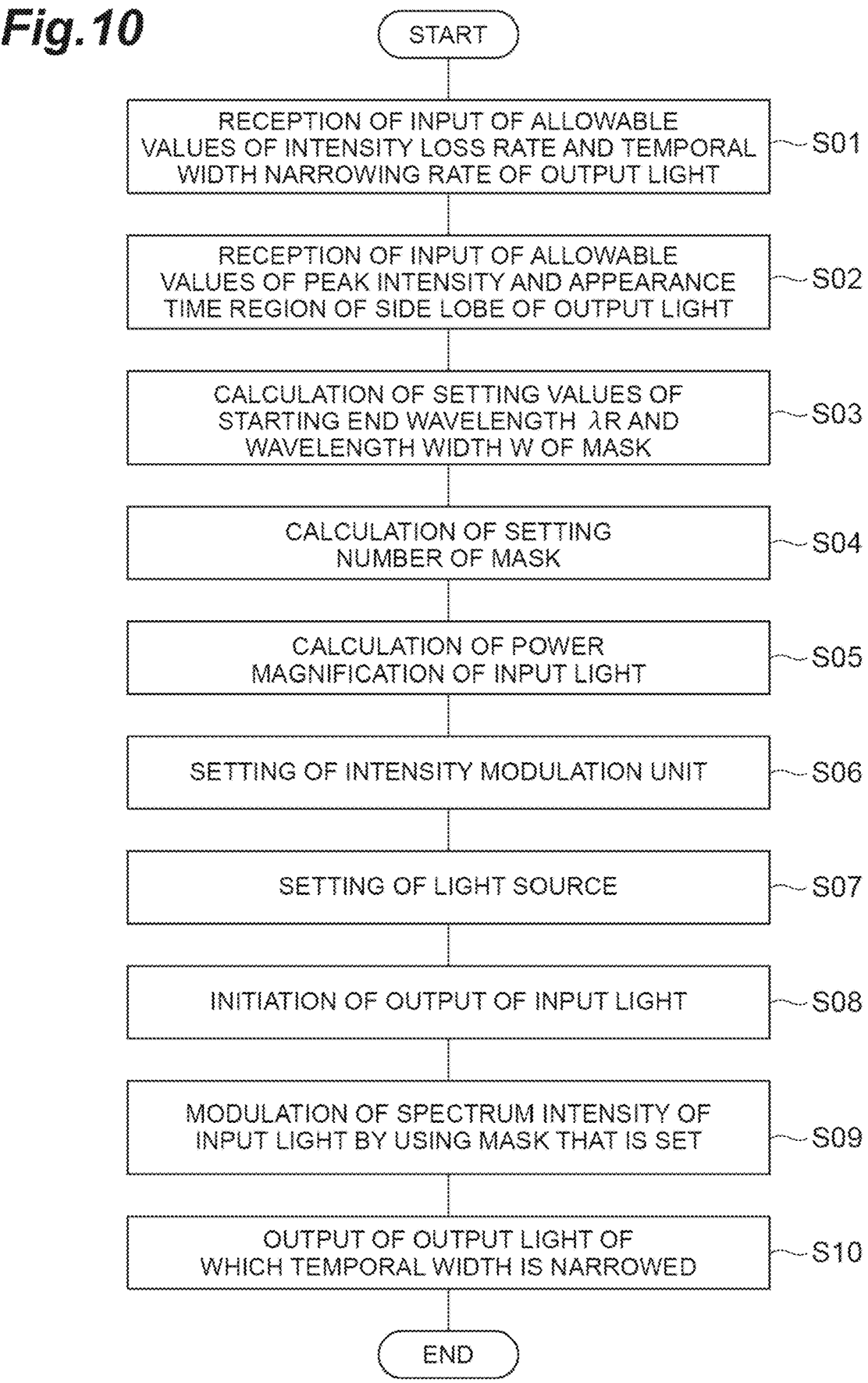
FIG. 10 is a flowchart illustrating an example of an operation of the light shaping device.

FIG. 10 is a flowchart illustrating an example of an operation of the light shaping device described above. As illustrated in the same drawing, in the light shaping device 1, first, an input of allowable values of the intensity loss rate and the temporal width narrowing rate of the output light L2 are received (step S01). In addition, an input of allowable values of a peak intensity and an appearance time region of a side lobe of the output light L2 is received (step S02). Next, parameters of the mask M are set on the basis of the input allowable values. Specifically, in the calculation unit 4, setting values of the starting end wavelength λr and the wavelength width W of the mask M are calculated (step S03). In addition, a setting number of the mask M is calculated (step S04). In addition, a power magnification of the input light L1 is calculated on the basis of the setting values of the starting end wavelength λr and the wavelength width W of the mask M (step S05).

After calculating the parameters of the mask M, setting of the intensity modulation unit 3 is performed so that a mask based on the calculation result is formed (step S06). The setting content of the intensity modulation unit 3 is different depending on an aspect of the intensity modulation unit 3. In the case of using the spatial light modulator 22 as the intensity modulation unit 3, a phase pattern is presented to the spatial light modulator 22, and in the case of using the shielding plate 26 or the dielectric multi-layer film mirror 27 as the intensity modulation unit 3, switching of the shielding plate 26 or the dielectric multi-layer film mirror 27 disposed on an optical path of the input light L1 is performed.

After setting the intensity modulation unit 3, setting of the light source 2 based on the calculation result in step S05 (setting of the power of the input light L1) is performed (step S07), and output of an optical pulse that becomes the input light L1 is initiated from the light source 2 on the basis of the setting (step S08). The input light L1 output from the light source 2 is input to the intensity modulation unit 3, and in the intensity modulation unit 3, a spectrum intensity is modulated by using the mask M that is set (step S09). Due to the modulation of the spectrum intensity by using the mask M, an optical pulse of which a temporal width is narrowed is output from the intensity modulation unit 3 as the output light L2 (step S10).

Reception of the input of the allowable values in step S01 and step S02 may be executed in any order or simultaneously. Reception of the input of the allowable value in step S02 may be omitted. The calculation in step S03 and step S04 may be executed in any order or simultaneously. In the case of omitting the reception of the input of the allowable value in step S02, the calculation in step S04 may be omitted. The calculation of the power magnification of the input light L1 in step S05 may be omitted. In the case of omitting the calculation of the power magnification of the input light L1 in step S05, setting of the light source 2 in step S07 is also omitted.

Operation and Effect

As described above, in the light shaping device 1, the spectrum intensity of the input light L1 is modulated with the mask M expressed by the starting end wavelength λr and the wavelength width W from the starting end wavelength λr. According to this, narrowing of a temporal width exceeding a theoretical limit in the case of modulating a spectrum phase becomes possible, and a temporal width narrowing rate with respect to an intensity loss of the optical pulse can be improved. In addition, parameters of the mask M are relatively simple, and continuous or high-accuracy intensity modulation with respect to each spectrum component is not necessary. Accordingly, it is possible to construct the intensity modulation unit 3 without introducing an expensive intensity modulator. As a result, a reduction in cost of the light shaping device 1 can be realized.

In addition, the mask M is set to be symmetrical with respect to the central wavelength λ0 of the input light L1. When using such a mask M, the temporal width narrowing rate with respect to the intensity loss of the optical pulse can be further improved.

In addition, the light shaping device includes the calculation unit 4 that calculates setting values of the starting end wavelength λr and the wavelength width W of the mask M that is used in the intensity modulation unit 3 on the basis of an allowable value of at least one of the intensity loss rate and the temporal width narrowing rate of the output light L2. According to this, the calculation unit 4 performs optimal setting of the mask M in consideration of the intensity loss rate and the temporal width narrowing rate. Accordingly, convenience of the light shaping device 1 can be improved.

In this embodiment, the calculation unit 4 calculates the setting values of the starting end wavelength λr and the wavelength width W of the mask M that is used in the intensity modulation unit 3 on the basis of an allowable value of at least one of a peak intensity and an appearance time region of a side lobe of the output light L2. In addition, the calculation unit 4 calculates a setting number of the mask M that is used in the intensity modulation unit 3 on the basis of an allowable value of at least one of the peak intensity and the appearance time region of the side lobe of the output light L2. According to this, the calculation unit 4 performs optimal setting of the mask M in consideration of the side lobe. Accordingly, convenience of the light shaping device 1 can be further improved.

In addition, in this embodiment, the calculation unit 4 calculates a power magnification of the input light L1 for compensating a peak intensity of the output light L2 on the basis of setting values of the starting end wavelength $\lambda r$ and the wavelength width W of the mask M that is used in the intensity modulation unit 3. According to this, the peak intensity of the output light L2 can be compensated in a level that is equivalent to a case where intensity modulation using the mask M is not performed.

In the example illustrated in FIG. 5 to FIG. 7, and FIG. 8A, the intensity modulation unit 3 includes the demultiplexing element 11 that demultiplexes the input light L1 for every wavelength, the intensity modulation element 12 that cuts a predetermined spectrum component in the input light L1 that is demultiplexed by the demultiplexing element 11, and the multiplexing element 13 that multiplexes spectrum components output from the intensity modulation element 12. According to this, the intensity modulation unit 3 that modulates the spectrum intensity of the input light L1 can be realized in a simple configuration.

As illustrated in FIG. 5 and FIG. 6, in a case where the intensity modulation element 12 is constituted by the spatial light modulator 22, the mask M can be formed dynamically and in a high degree of freedom due to a phase pattern presented to the spatial light modulator 22. In a case where the intensity modulation element 12 is constituted by the shielding plate 26 as illustrated in FIG. 7, and in a case where the intensity modulation element 12 is constituted by one or a plurality of the dielectric multi-layer film mirrors 27 as illustrated in FIG. 8A, the mask M can be formed in a simple configuration, and a further reduction in cost of the light shaping device 1 can be realized. In the example illustrated in FIG. 9, the intensity modulation unit 3 is constituted by one or a plurality of the dielectric multi-layer film mirrors 27. In this case, the mask M can be formed in a simpler configuration in proportion to omission of the demultiplexing element 11 and the multiplexing element 13, and a further reduction in cost of the light shaping device 1 can be realized.

In light shaping in the related art, a method of narrowing the temporal width of the pulse light by broadening a spectrum band is typically used. On the other hand, in the light shaping of the present disclosure, further narrowing of the temporal width of the pulse light is realized by cutting an arbitrary spectrum component with the mask M. The narrowing of the temporal width of the pulse light represents that a time differential value of the pulse light increases. That is, the narrowing of the temporal width of the pulse light effectively operates on an increase in an amplitude of terahertz waves or pulse shaping when generating terahertz wave pulses which vary in response to a differential value. In addition, the narrowing of the temporal width of the pulse also contributes to an improvement of time resolution of pulse measurement represented by time of flight (TOF) measurement.

In the case of applying the pulse light to an imaging technology such as a streak camera and a sequentially timed all-optical mapping photography (STAMP), the narrowing of the temporal width of the pulse light contributes to an improvement of an imaging speed and time resolution. Due to the improvement of the time resolution, a reduction in a time interference noise is expected, and an influence of a motion blur is reduced, and thus an improvement of an S/N ratio is expected. In a laser processing field, due to the narrowing of the temporal width of the pulse light, time for which laser light interacts with a substance can be reduced. According to this, it is possible to enhance a non-thermal processing effect while reducing an influence of heat on an object to be processed. In a laser microscope field, an improvement of induction efficiency of non-linear optical effect or an improvement of the S/N ratio is expected.

Verification of Relationship Between Parameters of Mask and Narrowing of Temporal Width of Pulse Light Hereinafter, a relationship between parameters of a mask and narrowing of a temporal width of pulse light will be described. First, description will be given of a result of verification on narrowing of the temporal width of the pulse light in the case of performing intensity modulation by using the mask. As the mask, a pair of single masks symmetrical with respect to the central wavelength $\lambda 0$ is assumed (refer to FIG. 4). As the input light, a single pulse of which a wavelength width is 5 nm and the central wavelength $\lambda 0$ is 800 nm is assumed. In a case where the input light is set as a Fourier transform limit pulse of which a phase spectrum is a flat, the full width at half maximum becomes approximately 135 fs. FIG. 11A is a view showing a variation of a temporal width of output light in a case where the parameters (the starting end wavelength $\lambda r$ and the wavelength width W) of the mask are changed. In the same drawing, the horizontal axis represents the starting end wavelength $\lambda r$, the vertical axis represents the temporal width (full width at half maximum) of the output light, and simulation results in a case where W is 0.73 nm and W is 1.22 nm are plotted. In addition, a result of a case where intensity modulation with the mask is not performed (W is 0 nm: Fourier transform limit pulse) is plotted in combination so as to show a relative variation of the temporal width.

From the result in FIG. 11A, it can be seen that the larger the wavelength width W of the mask is, the further the temporal width of the output light is narrowed. In addition, it can be seen that the further the starting end wavelength $\lambda r$ is close to the central wavelength $\lambda 0$ of the input light, the further the temporal width of the output light is narrowed. When W is 1.22 nm, in a case where $\lambda r$ is near the central wavelength $\lambda 0$, the temporal width of the output light is less than 110 fs, and narrowing of the temporal width by approximately 22% is expected. On the other hand, FIG. 11B is a view showing a result near the central wavelength in FIG. 11A in an enlarged manner. As shown in FIG. 11B, it can be seen that the further the starting end wavelength $\lambda r$ is close to the central wavelength $\lambda 0$ of the input light, the further the temporal width of the output light gradually decreases, but under a condition where the starting end wavelength $\lambda r$ and the central wavelength $\lambda 0$ are the same as each other, the temporal width of the output light slightly increases. From the results, it can be concluded that equalizing of the starting end wavelength $\lambda r$ and the central wavelength $\lambda 0$ is not necessarily a condition capable of narrowing the temporal width of the output light most.

Figure 12:
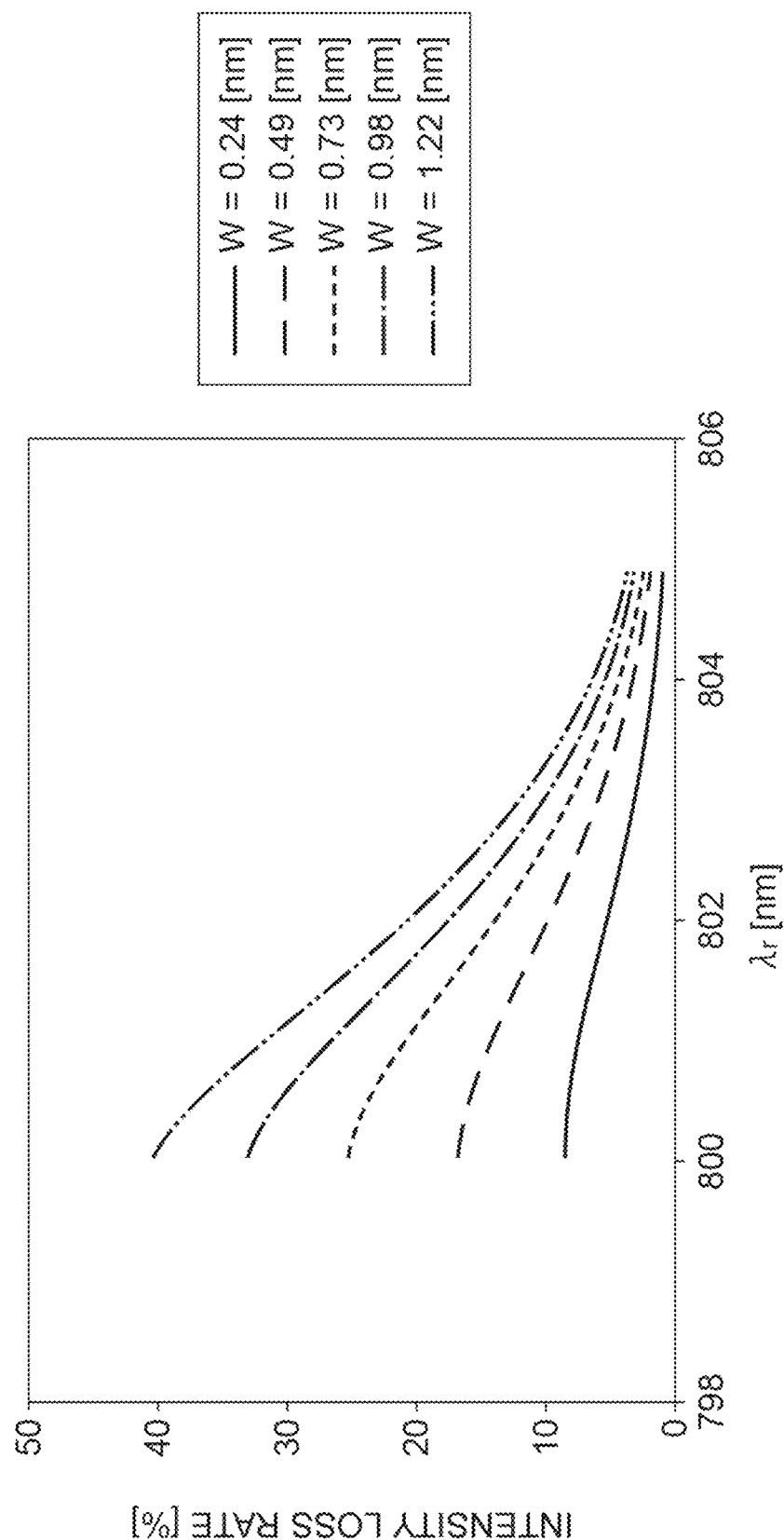
FIG. 12 is a view showing a variation of an intensity loss rate of the output light in a case where the parameters of the mask are changed.

FIG. 12 is a view showing a variation of the intensity loss rate of the output light in a case where the parameters of the mask are changed. In the same drawing, the horizontal axis represents the starting end wavelength $\lambda r$, the vertical axis represents intensity loss rate, and simulation results in a case where W is 0.24 nm, W is 0.49 nm, W is 0.73 nm, W is 0.98 nm, and W is 1.22 nm are plotted. From the results in FIG. 12, it can be seen that the further the starting end wavelength $\lambda r$ is close to the central wavelength $\lambda 0$, the higher the intensity loss rate of the output light becomes. In addition, it can be seen that the larger the wavelength width W of the mask is, the higher the intensity loss rate of the output light becomes.

When considering this result in combination with the result in FIG. 11A, it can be seen that the temporal width narrowing rate and the intensity loss rate are in a trade-off relationship. Accordingly, it is considered that the parameters of the mask are necessary to be set within an allowable range of the intensity loss in practical use when narrowing the temporal width of the output light. In this regard, in Japanese Unexamined Patent Publication No. 2016-218141 as citation list, narrowing of the temporal width by approximately 15% is shown by allowing approximately 60% of intensity loss. In the method of the present disclosure, from the results in FIG. 11A and FIG. 12, narrowing of the temporal width by approximately 22% can be realized by allowing approximately 40% of intensity loss. In addition, in narrowing of the temporal width by approximately 15%, approximately 25% of intensity loss may be allowed. Accordingly, it can be seen that a high temporal width narrowing effect is obtained at a smaller intensity loss.

Figure 13:
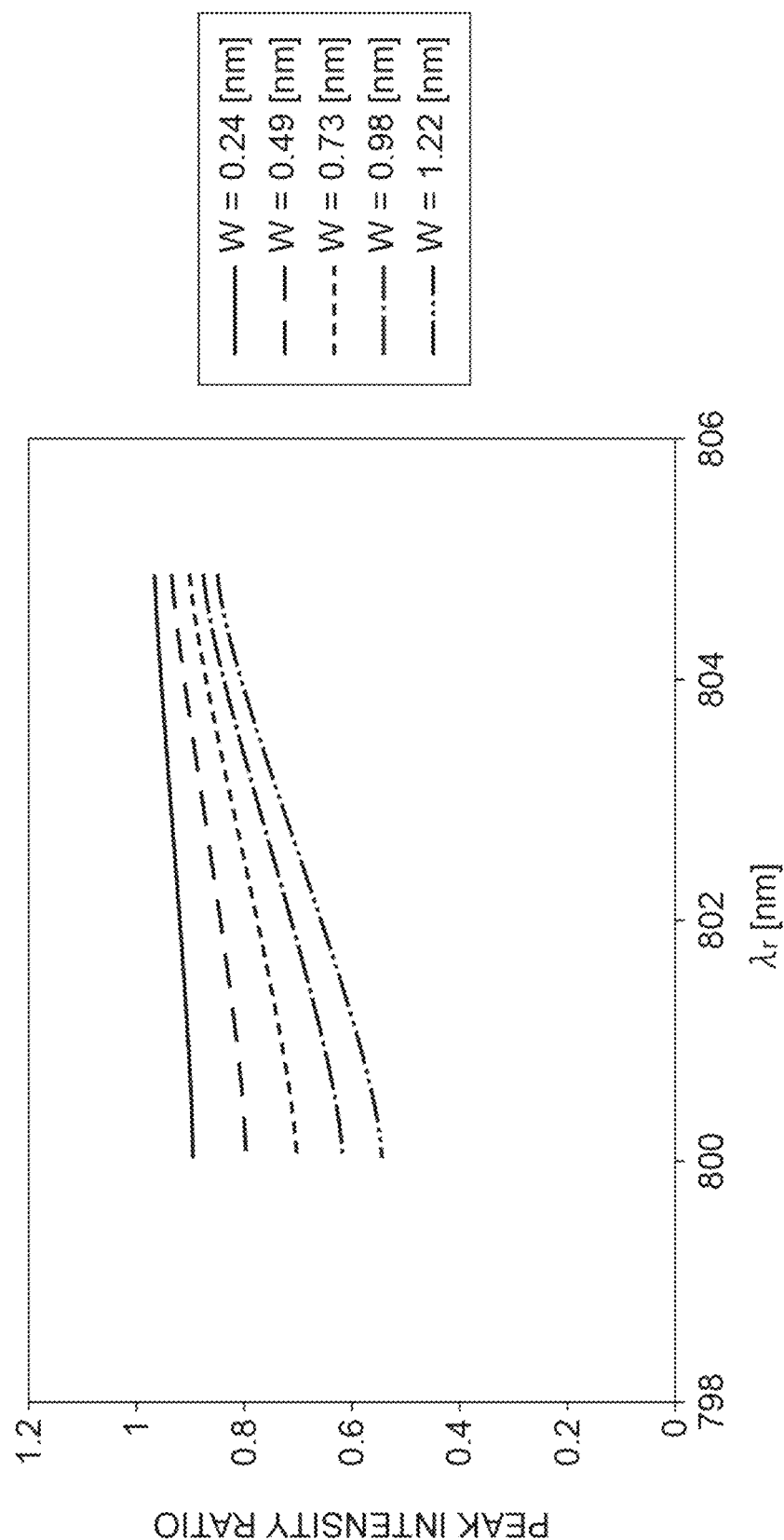
FIG. 13 is a view showing a variation of a peak intensity of the output light in a case where the parameters of the mask are changed.

FIG. 13 is a view showing a variation of the peak intensity of the output light in a case where the parameters of the mask are changed. In the same drawing, the horizontal axis represents the starting end wavelength $\lambda r$ and the vertical axis represents a peak intensity ratio. In FIG. 13, simulation results in a case where W is 0.24 nm, W is 0.49 nm, W is 0.73 nm, W is 0.98 nm, and W is 1.22 nm are plotted as in FIG. 12. The peak intensity ratio of the output light is a peak intensity of a temporal waveform with respect to a peak intensity of a temporal waveform in a case where intensity modulation with the mask is not performed (Fourier transform limit pulse). In a case where a peak intensity ratio exceeds 1, this case represents that the peak intensity further increases in comparison to the Fourier transform limit pulse by the intensity modulation using the mask. In a case where the peak intensity ratio is less than 1, this case represents that the peak intensity further decreases in comparison to the Fourier transform limit pulse by the intensity modulation using the mask.

From the result in FIG. 13, in a case where W is 0.24 nm, the peak intensity ratio is approximately 0.9, whereas the further W increases, the further the peak intensity ratio decreases. In a case where W is 1.22 nm, the peak intensity ratio is less than 0.6. From this, it can be seen that the larger the wavelength width W of the mask is (that is, the higher the intensity loss rate and the temporal width narrowing rate are), the further the peak intensity of the output light decreases.

Figure 14:
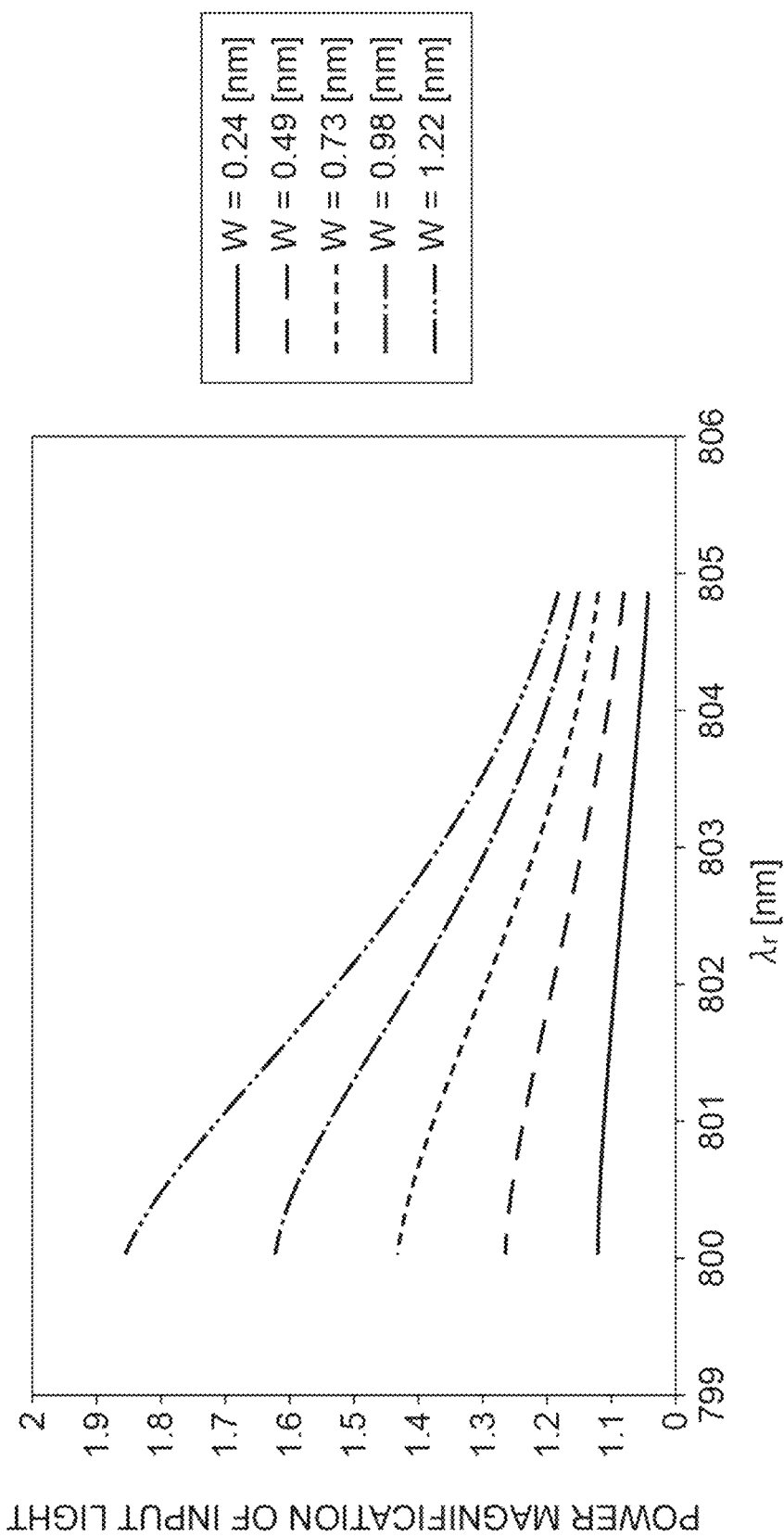
FIG. 14 is a view showing power of input light which is necessary for compensation of the peak intensity.

In a case where the peak intensity of the output light becomes a problem in application of the light shaping device 1, the problem can be compensated by raising power of the input light. FIG. 14 is a view showing power of the input light which is necessary for compensation of the peak intensity. In the same drawing, the horizontal axis represents the starting end wavelength $\lambda r$ and the vertical axis represents the power magnification of the input light. In FIG. 14, simulation results in a case where W is 0.24 nm, W is 0.49 nm, W is 0.73 nm, W is 0.98 nm, and W is 1.22 nm are plotted as in FIG. 13. The power magnification of the input light is a ratio between power of the input light in a case where intensity modulation with the mask is not performed and power of the input light which is necessary for obtaining a peak intensity that is the same as a peak intensity of a temporal waveform of the output light in a case where intensity modulation with the mask is not performed. From results in FIG. 14, for example, in a case where W is 1.22 nm, when increasing the power of the input light by approximately 1.85 times, the peak intensity of the output light can be compensated in the same level as in a case where intensity modulation with a mask is not performed.

Figure 15:
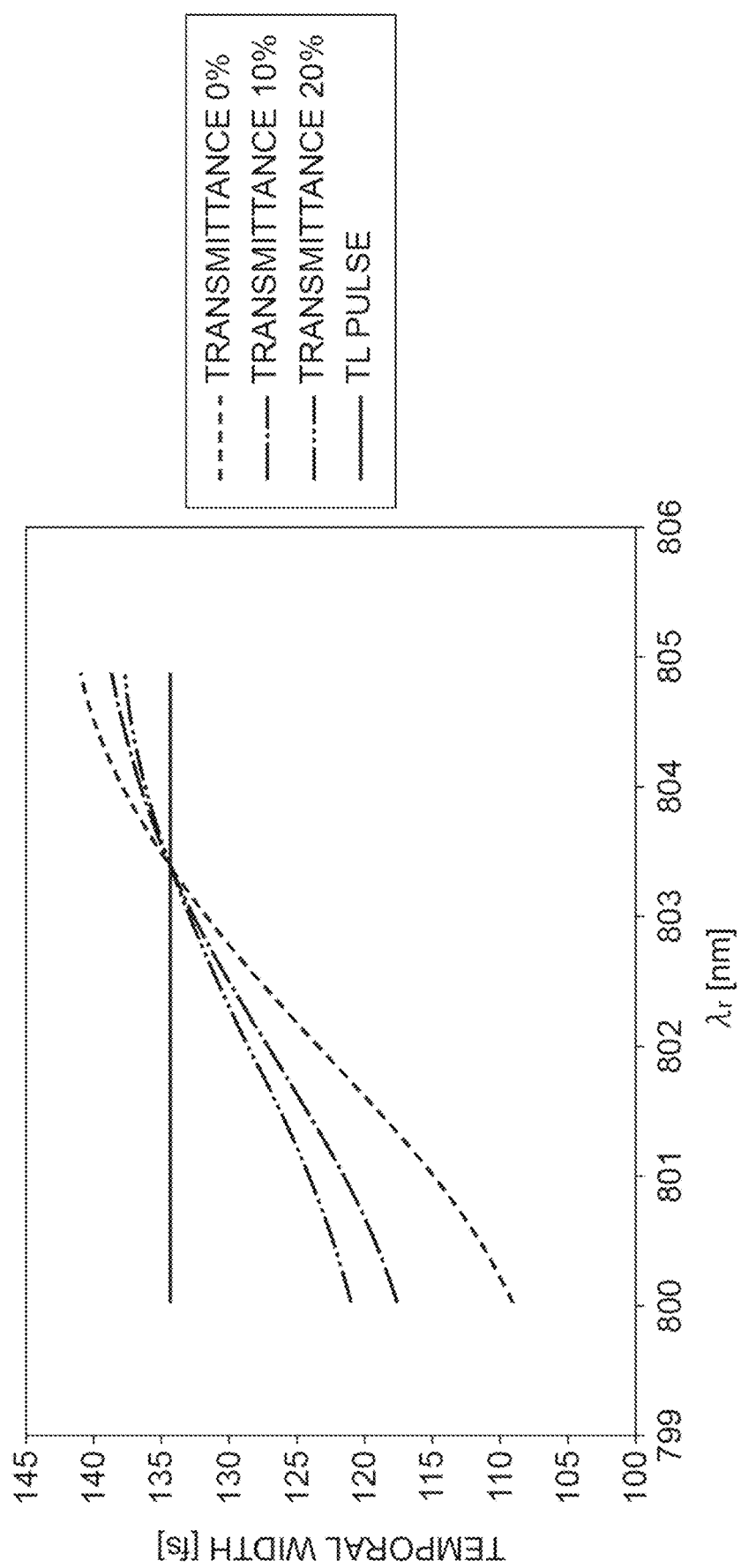
FIG. 15 is a view showing a relationship between accuracy of the mask and the temporal width of the output light.

FIG. 15 is a view showing a relationship between accuracy of the mask and the temporal width of the output light. In the same drawing, the horizontal axis represents the starting end wavelength $\lambda r$ and the vertical axis represents the temporal width (full width at half maximum) of the output light. In the above-described simulation, an ideal model (refer to FIG. 4) in which a spectrum intensity of the input light of a wavelength region of which an intensity is modulated with the mask is set to 0 is used. However, in an actual device, it is also assumed that the spectrum intensity of the input light may not be completely 0 due to the configuration of the intensity modulation unit 3, or the like. In FIG. 15, under a condition that W is 1.22 nm, an intensity (transmittance) of light that is not subjected to intensity modulation with the mask and is transmitted is changed, and a simulation result of a temporal width of the output light with respect to each transmittance is plotted. Conditions of the transmittance are set to three conditions of 0%, 10%, and 20%. In addition, for comparison, a result in the case of Fourier transform limit pulse (TL pulse) is plotted in combination.

As shown in FIG. 15, for example, at $\lambda r$ of 800.02 nm, the temporal width of the output light in a case where the transmittance is 0% is 109 fs, whereas the temporal width of the output light in a case where the transmittance is 10% is 118 fs, and the temporal width of the output light in a case where the transmittance is 20% is 121 fs. From the results, it can be seen that the transmittance of the input light at a wavelength region of which an intensity is modulated with the mask has an influence on the temporal width narrowing rate of the output light. In addition, even when a transmittance difference is 10%, it can be seen that in a case where the transmittance increases from 0% to 10%, a decrease in the temporal width narrowing rate of the output light is as large as two or more times in comparison to a case where the transmittance increases from 10% to 20%. Accordingly, from the viewpoint of improving the temporal width narrowing rate of the output light, it can be concluded that it is preferable that the transmittance of the input light at a wavelength region of which an intensity is modulated with the mask is suppressed to 10% or less, and more preferably near 0%.

Next, description will be given of a result of verification on a side lobe of the output light in a case where intensity modulation is performed with the mask. As described above, the starting end wavelength $\lambda r$ and the wavelength width W of the mask are parameters having an influence on the temporal width of the output light, and are also parameters having an influence on a shape of the side lobe of the output light. It is assumed that the peak intensity and the appearance time region of the side lobe become a problem in application of the light shaping device 1.

Figure 16:
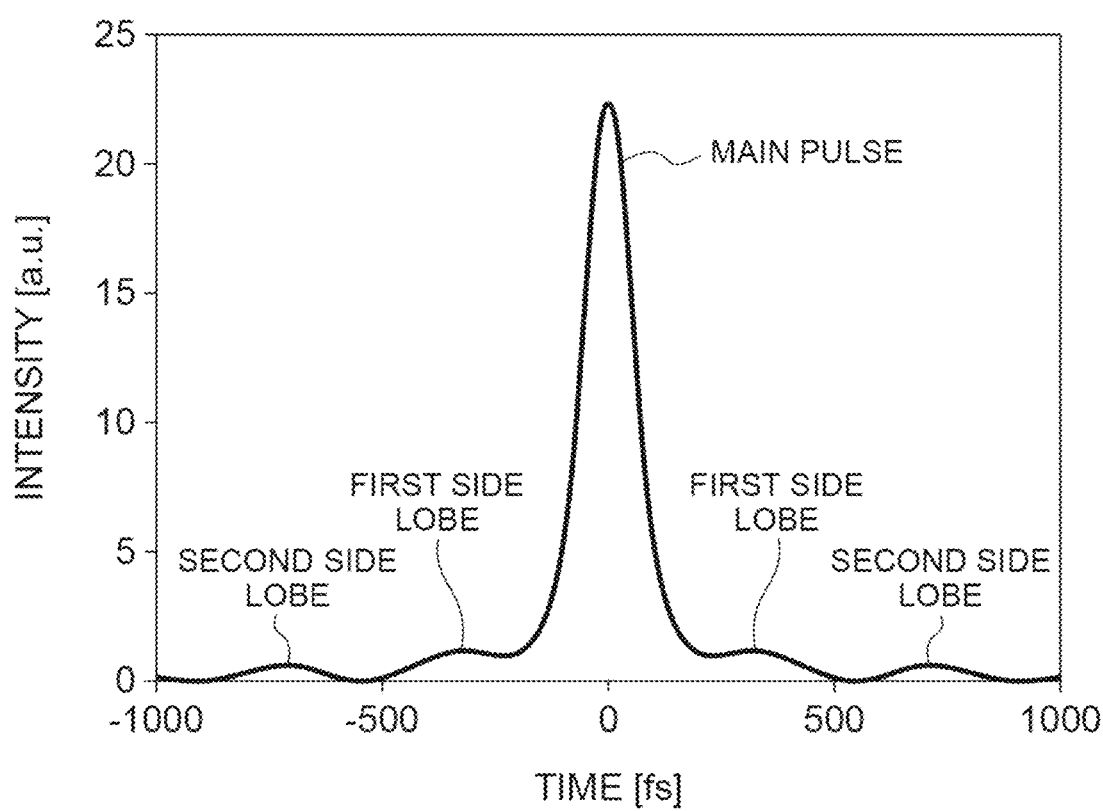
FIG. 16 is a view showing an example of a side lobe that appears in a temporal waveform of the output light.

For example, the side lobe is high order light that appears on both sides of a main pulse in pulse light as shown in FIG. 16. An example in FIG. 16 is a temporal waveform of the output light in a case where intensity modulation is performed by using masks (refer to FIG. 4) symmetrical with respect to the central wavelength $\lambda 0$, and in a case where the masks are symmetrical with respect to the central wavelength $\lambda 0$, side lobes of the output light also appear to be symmetrical with respect to the main pulse. Here, a first peak that appears in a time region on both sides of the main pulse is referred to as a first side lobe, and the subsequent peak that appears in a time region on an outer side of the above-described time region is referred to as a second side lobe.

Figure 17:
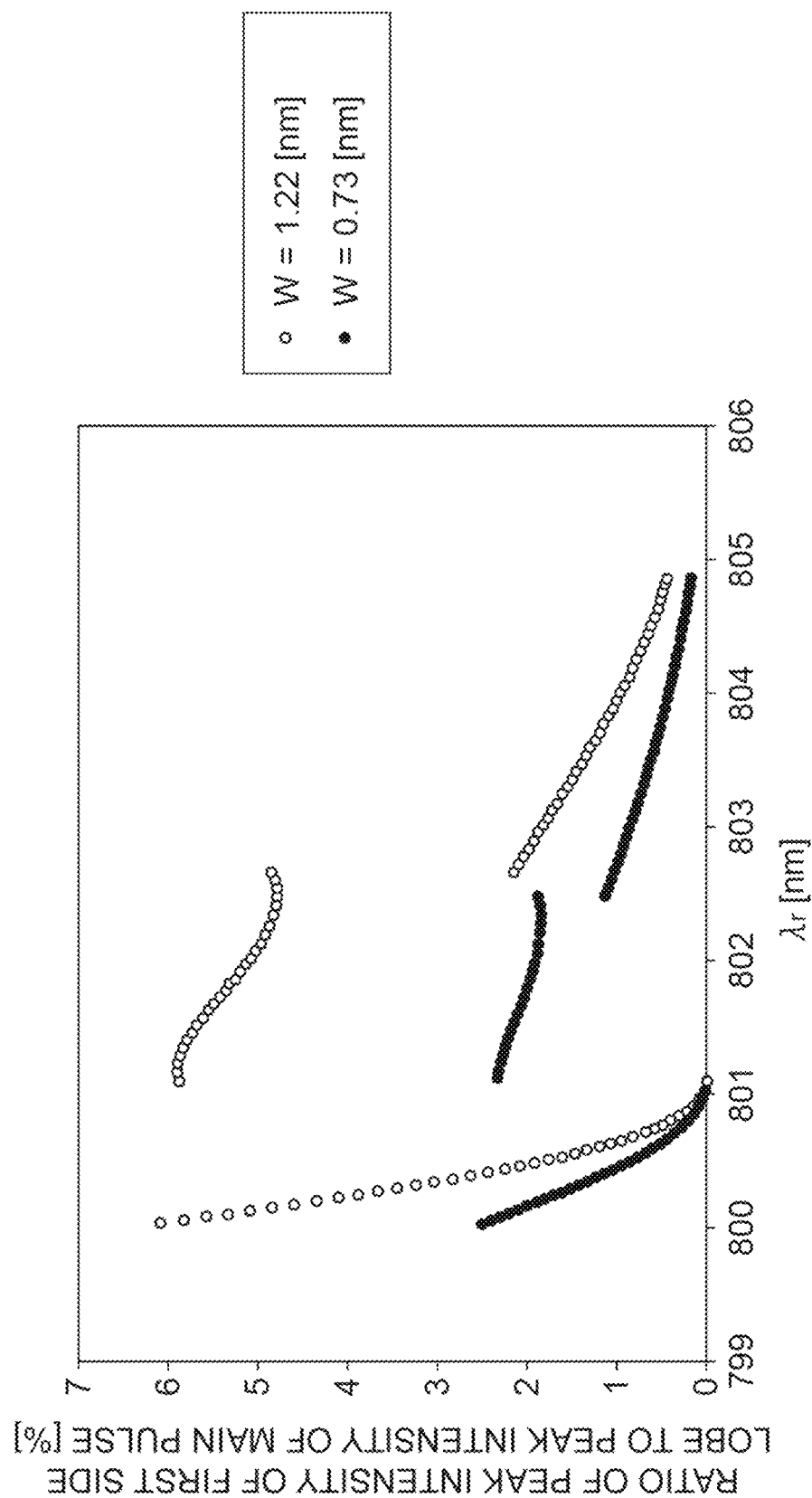
FIG. 17 is a view showing a variation of a peak intensity of the side lobe in a case where the parameters of the mask are changed.

FIG. 17 is a view showing a variation of a peak intensity of the side lobe in a case where the parameters of the mask are changed. In the same drawing, the horizontal axis represents the starting end wavelength $\lambda r$, the vertical axis represents a ratio of the peak intensity of the side lobe (first side lobe) to the peak intensity of the main pulse, and simulation results in a case where W is 0.73 nm and W is 1.22 nm are plotted. From the results in FIG. 17, it can be seen that the larger the wavelength width W of the mask is, the further the peak intensity of the side lobe tends to increase. In addition, it can be seen that the peak intensity of the side lobe varies in accordance with a value of the starting end wavelength $\lambda r$. In the example in FIG. 17, it can be seen that in a region where $\lambda r$ is 800 to 801 nm, the larger $\lambda r$ is, the further peak intensity of the side lobe decreases. This tendency is also true of a region where $\lambda r$ is 801 to 802 nm and a region where $\lambda r$ is 802 to 805 nm.

Figure 18:
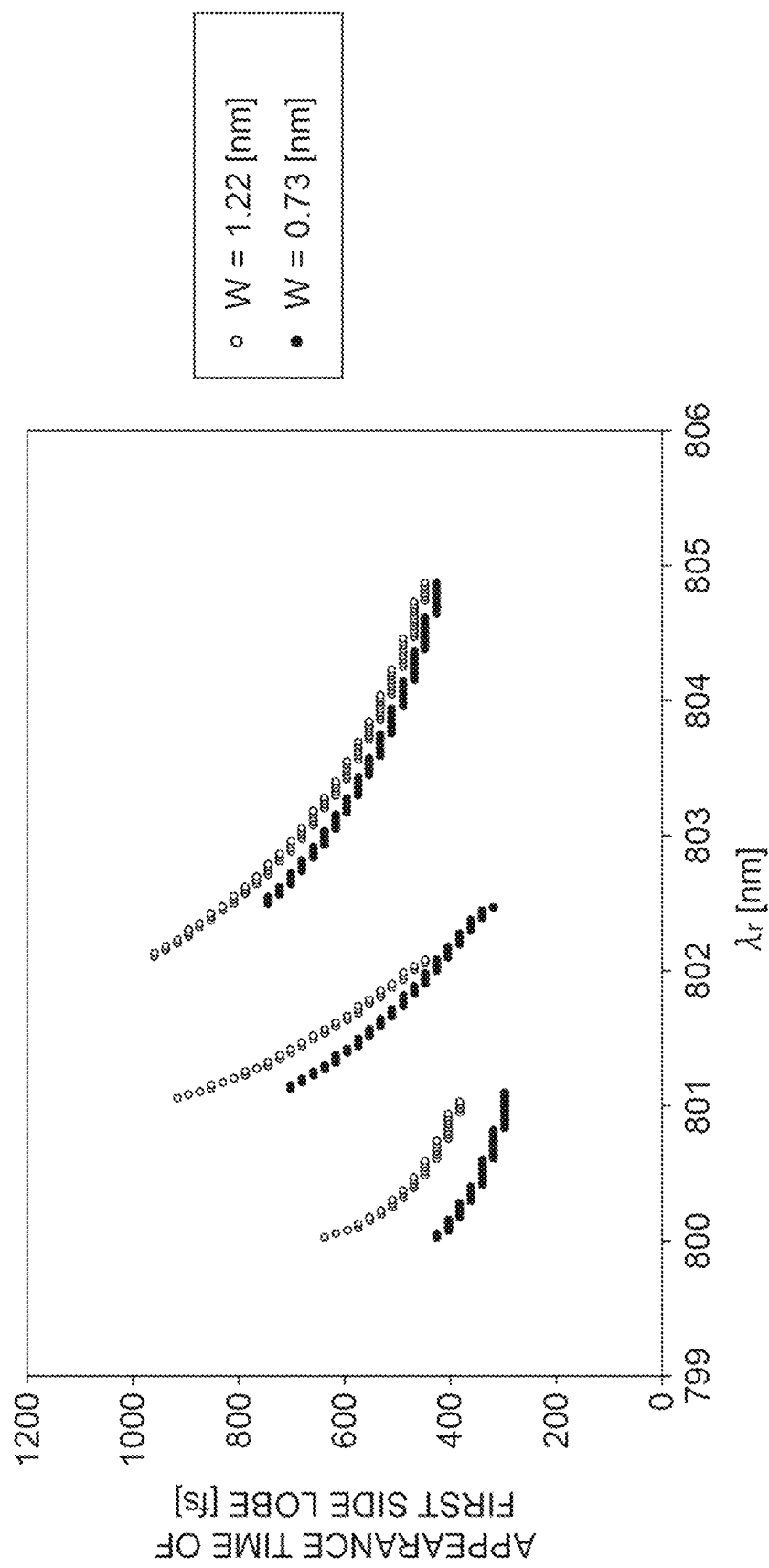
FIG. 18 is a view showing a variation of an appearance time of the side lobe in a case where the parameters of the mask are changed.

FIG. 18 is a view showing a variation of the appearance time of the side lobe in a case where the parameters of the mask are changed. In the same drawing, the horizontal axis represents the starting end wavelength $\lambda r$, the vertical axis represents the appearance time of the side lobe (first side lobe), and simulation results in a case where W is 0.73 nm and W is 1.22 nm are plotted. The appearance time of the side lobe corresponds to a time interval between the peak position of the main pulse and the peak position of the side lobe. From the results in FIG. 18, it can be seen that the larger the wavelength width W of the mask is, the further the appearance time of the side lobe tends to deviate from the appearance time of the main pulse. In addition, it can be seen that the appearance time of the side lobe varies in accordance with a value of the starting end wavelength $\lambda r$. In the example in FIG. 18, in a region where $\lambda r$ is 800 to 801 nm, it can be seen that the larger $\lambda r$ is, the further the appearance time of the side lobe is close to the appearance time of the main pulse. This tendency is also true of a region where $\lambda r$ is 801 to 802 nm and a region where $\lambda r$ is 802 to 805 nm.

From results in FIG. 17 and FIG. 18, it can be seen that the peak intensity and the appearance time region of the side lobe can be controlled through selection of the starting end wavelength $\lambda r$ and the wavelength width W of the mask. Note that, in the results in FIG. 17 and FIG. 18, a discontinuity is shown in the plot. The discontinuity disappears when the first side lobe is closer to the main pulse to a certain extent in the case of changing the starting end wavelength $\lambda r$, and occurs because the second side lobe replaces the first side lobe.

Figure 19:
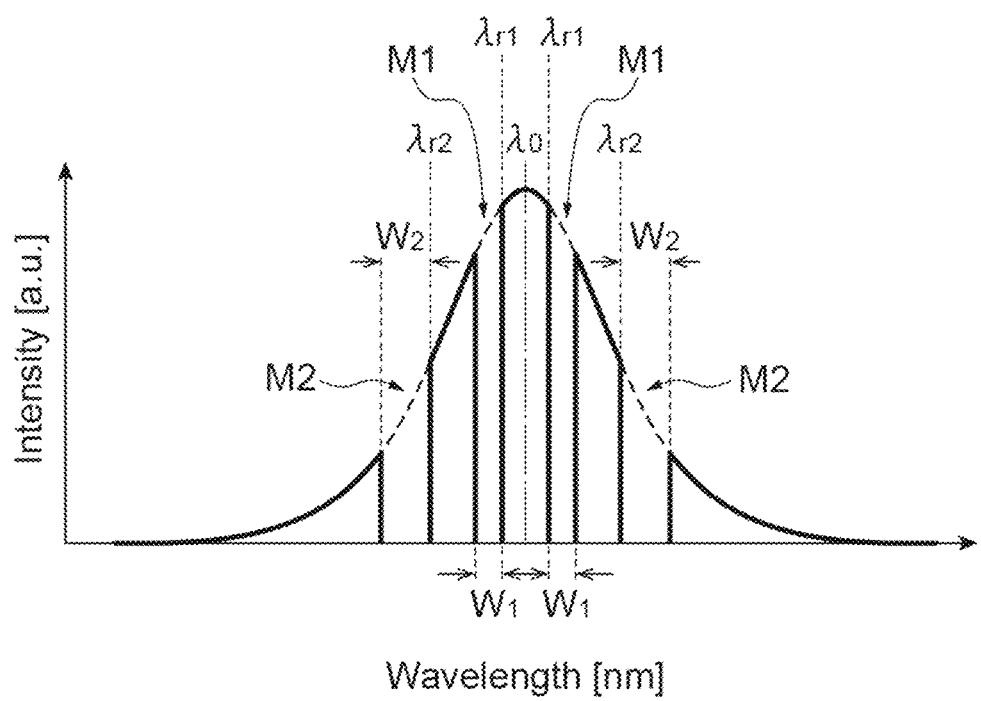
FIG. 19 is a view showing a mask (double mask) that can be used in the intensity modulation unit.

Next, description will be given of a relationship between the setting number of the mask and the temporal waveform of the output light. In the above-described simulations, a pair of single masks symmetrical with respect to the central wavelength $\lambda 0$ is assumed (refer to FIG. 4). However, here, as shown in FIG. 19, consideration will be given on a case where a plurality of pairs of masks (multi masks) are set to be symmetrical with respect to the central wavelength $\lambda 0$. In FIG. 19, two pairs of masks (double masks) symmetrical with respect to the central wavelength $\lambda 0$ are shown. Masks (primary masks M1) on the central wavelength $\lambda 0$ side are expressed by a starting end wavelength $\lambda r1$ and a wavelength width W1. Masks (secondary masks M2) on an outer side of the primary masks M1 are expressed by a starting end wavelength $\lambda r2$ and a wavelength width W2.

Figure 20:
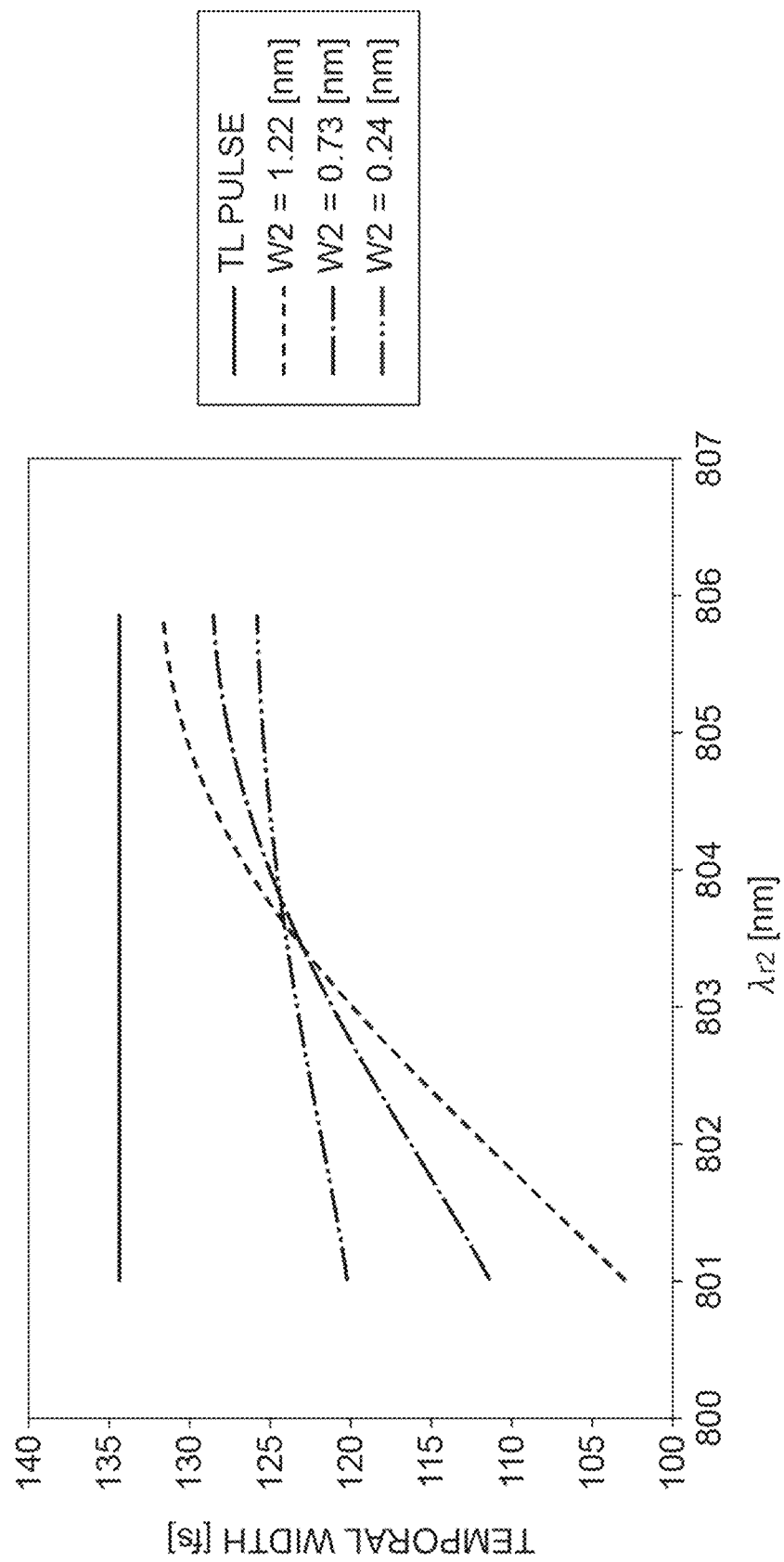
FIG. 20 is a view showing a variation of a temporal width of the output light in a case where the parameters of the mask are changed.

FIG. 20 is a view showing a variation of the temporal width of the output light in a case where the parameters of the mask are changed. In the input light, a single pulse in which the wavelength width is 5 nm and the central wavelength $\lambda 0$ is 800 nm is assumed. In a case where the input light is set as a Fourier transform limit pulse of which a phase spectrum is flat, the full width at half maximum becomes approximately 135 fs. For simplification of simulation, the starting end wavelength $\lambda r1$ of the primary masks is set to a constant of 800.49 nm, and the wavelength width W1 is set to a constant of 0.49 nm. In FIG. 20, the horizontal axis represents the starting end wavelength $\lambda r2$, the vertical axis represents the temporal width (full width at half maximum) of the output light, and simulation results in a case where W2 is 0.24 nm, W2 is 0.73 nm, and W2 is 1.22 nm are plotted. In addition, a result in a case where intensity modulation with a mask is not performed (W1=W2=0 nm: the case of a Fourier transform limit (TL) pulse) is plotted in combination in order to show a relative variation of the temporal width.

From the results in FIG. 20, it can be seen that the larger the wavelength width W2 of the mask is, the further the temporal width of the output light is narrowed. In addition, it can be seen that the further the starting end wavelength $\lambda r2$ of the secondary masks is close to a terminating end wavelength ($=\lambda r1+W1$) of the primary masks, the further the temporal width of the output light is narrowed. That is, it can be said that a temporal width narrowing condition of the output light in the case of the multi masks is a case where the wavelength width W of the masks is large, and the starting end wavelength $\lambda r$ is closer to the central wavelength $\lambda 0$ as in the single mask.

Figure 21:
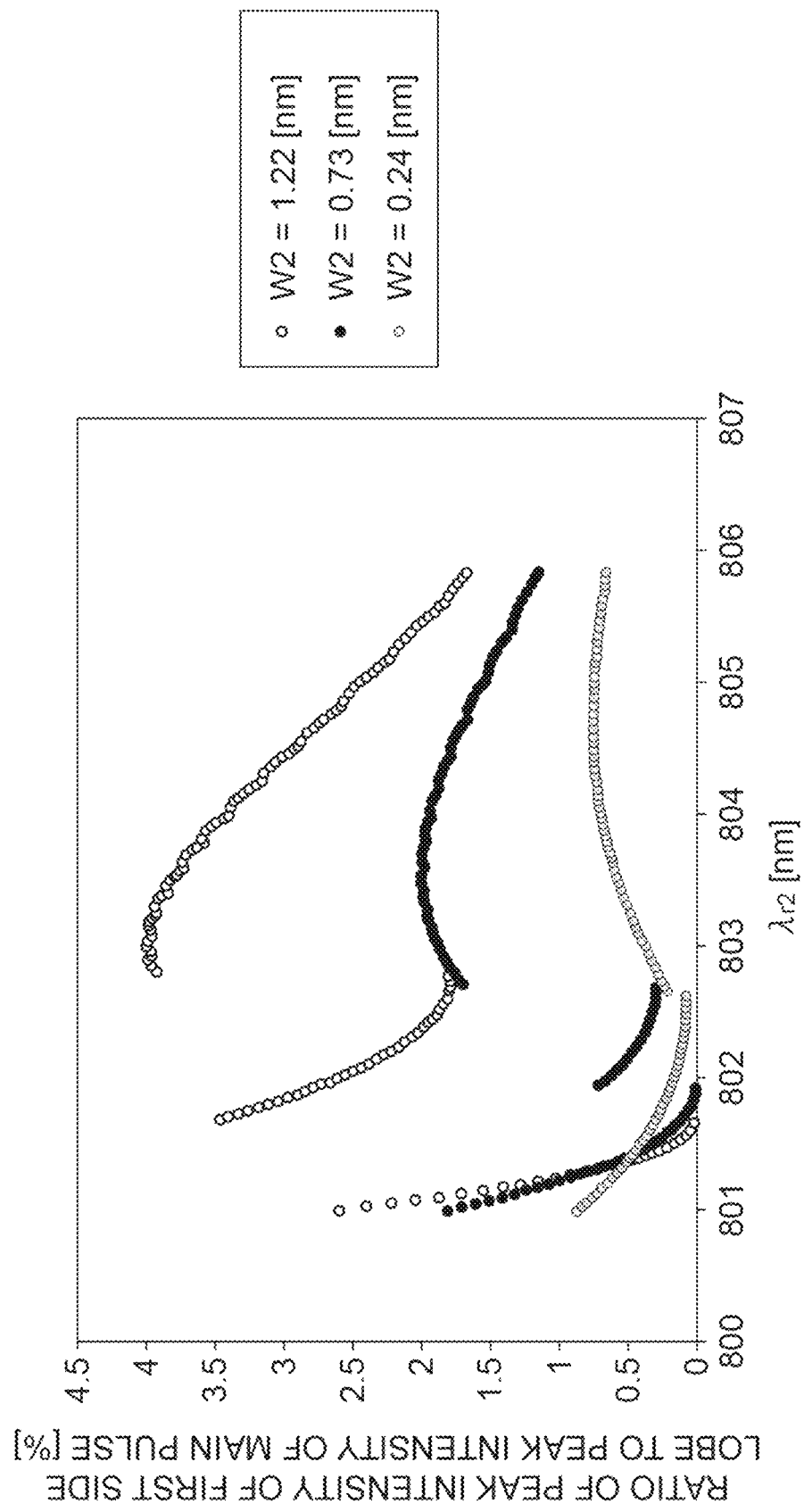
FIG. 21 is a view showing a variation of the peak intensity of the side lobe in a case where the parameters of the mask are changed.

FIG. 21 is a view showing a variation of the peak intensity of the side lobe in a case where the parameters of the mask are changed. In FIG. 21, the horizontal axis represents the starting end wavelength $\lambda r2$, the vertical axis represents a ratio of the peak intensity of the side lobe (first side lobe) to the peak intensity of the main pulse, and simulation results in a case where W2 is 0.24 nm, W2 is 0.73 nm, and W2 is 1.22 nm are plotted. The parameters of the input light are the same as the case in FIG. 20. From the results in FIG. 21, it can be seen that the larger the wavelength width W2 of the mask is, the further the peak intensity of the first side lobe increases. In addition, it can be seen that the peak intensity of the first side lobe varies in accordance with a value of the starting end wavelength $\lambda r2$.

In the light shaping of the present disclosure, as described above, the temporal width narrowing rate and the intensity loss rate are in a trade-off relationship. In practical use of the light shaping, the temporal width narrowing rate is set within an allowable range of the intensity loss rate. Here, in the following simulation, verification is made on which temporal waveform of the output light is obtained in the single mask and the double masks in a case where the intensity loss rate is set to a constant value.

Figure 22A:
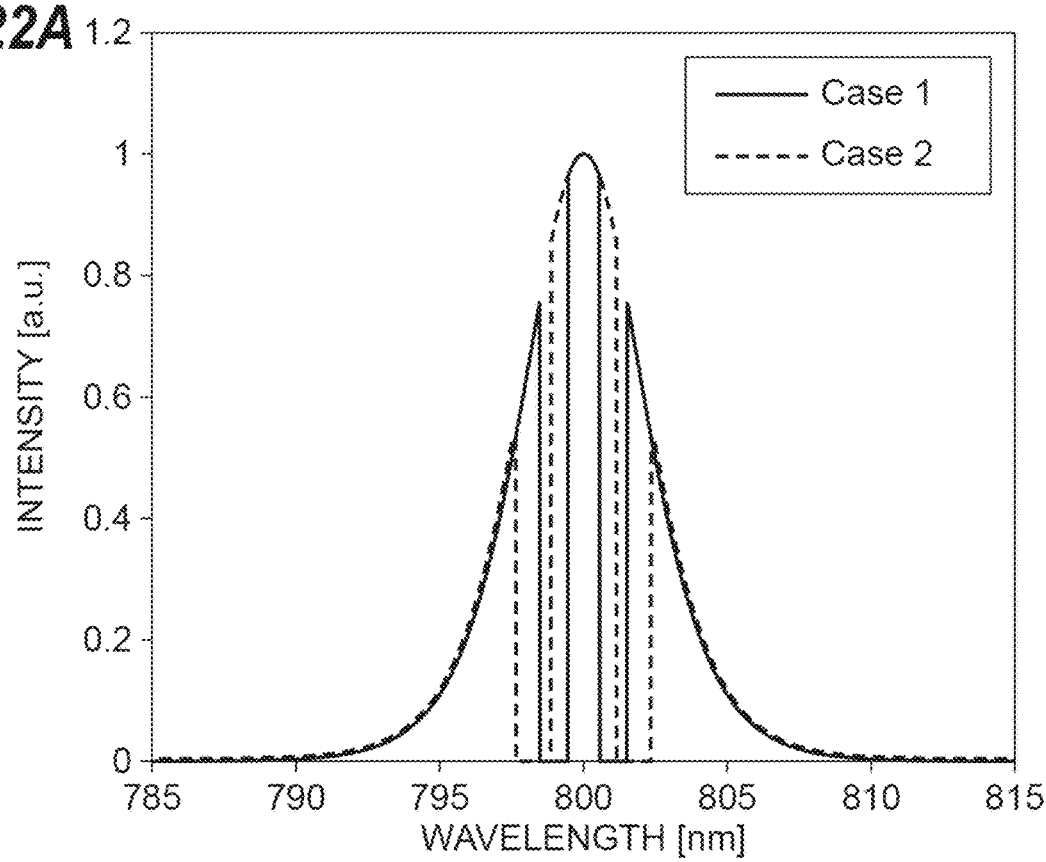
FIG. 22A is a view showing a model of the single mask in a case where the intensity loss rate is set to be constant.
Figure 22B:
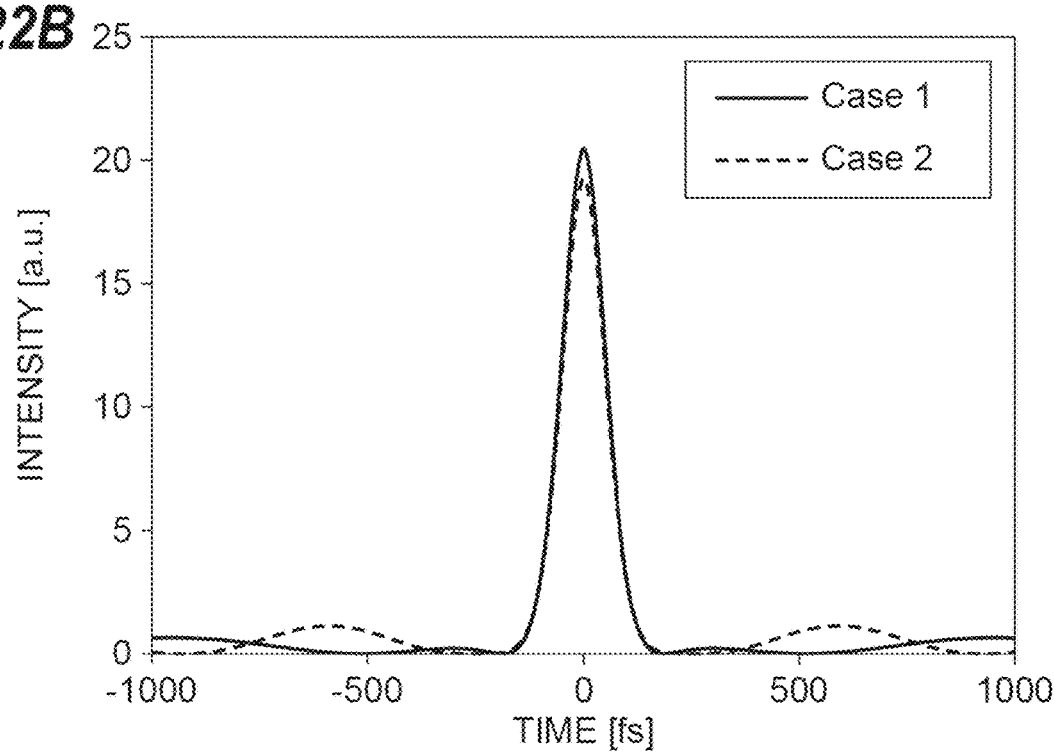
FIG. 22B is a view showing the temporal waveform of the output light in a case where intensity modulation is performed by using the mask in FIG. 22A.
Figure 24:
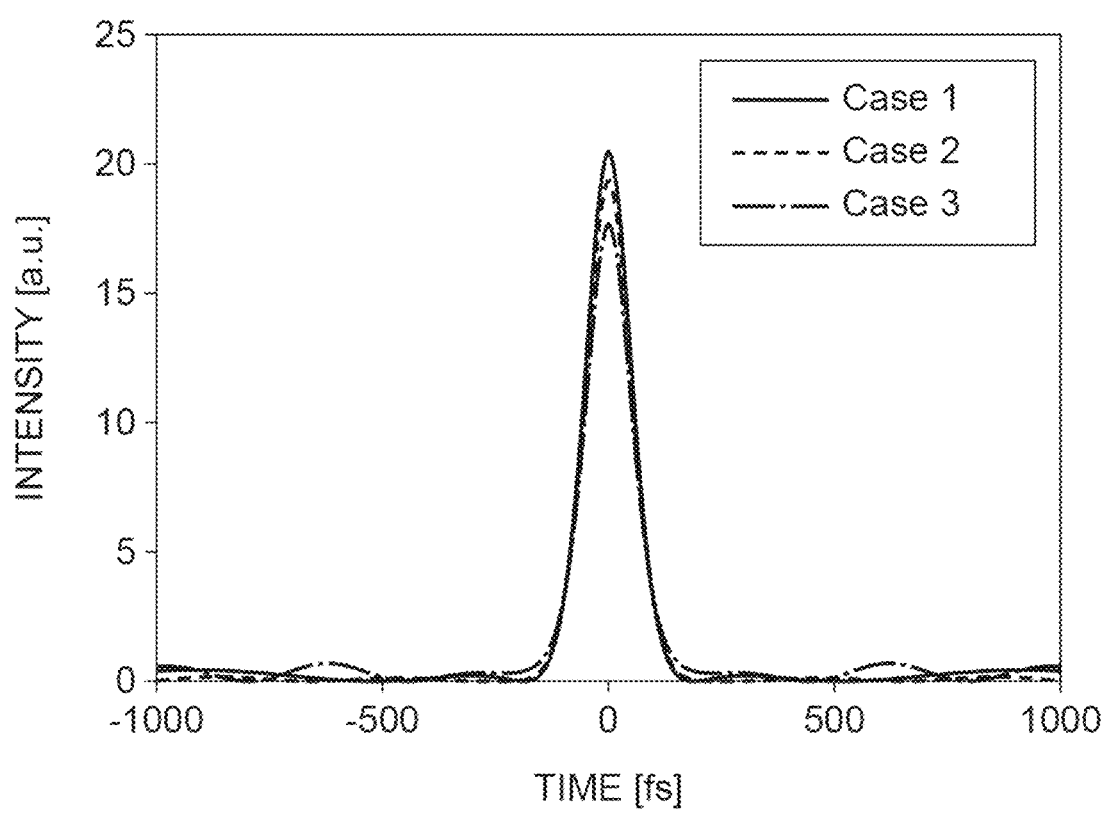
FIG. 24 is a view showing the temporal waveform of the output light in a case where intensity modulation is performed by using the masks shown in FIG. 23A to FIG. 23C.

FIG. 22B and FIG. 24 show temporal waveforms of the output light which are obtained with respect to models of the single mask and the double masks, respectively by setting the intensity loss rate to 30%. In FIG. 22A, a model of two single masks in which parameters are different from each other is shown. In Case 1, $\lambda r$ is set to 800.56 nm, and W is set to 0.98 nm. In Case 2, $\lambda r$ is set to 801.15 nm, and W is set to 1.22 nm.

FIG. 22B is a view showing a temporal waveform of the output light in a case where intensity modulation is performed by using the mask. As shown in the same drawing, in any of Case 1 and Case 2, the temporal width (full width at half maximum) of the output light is 116.1 fs. On the other hand, in Case 1 and Case 2, a great difference occurs in a shape of the first side lobe. A ratio of the peak intensity of the first side lobe to the peak intensity of the main pulse is 1.09% in Case 1 and 5.89% in Case 2. In addition, an appearance time of the first side lobe is approximately 300 fs in Case 1 and approximately 600 fs in Case 2.

Figure 23A:
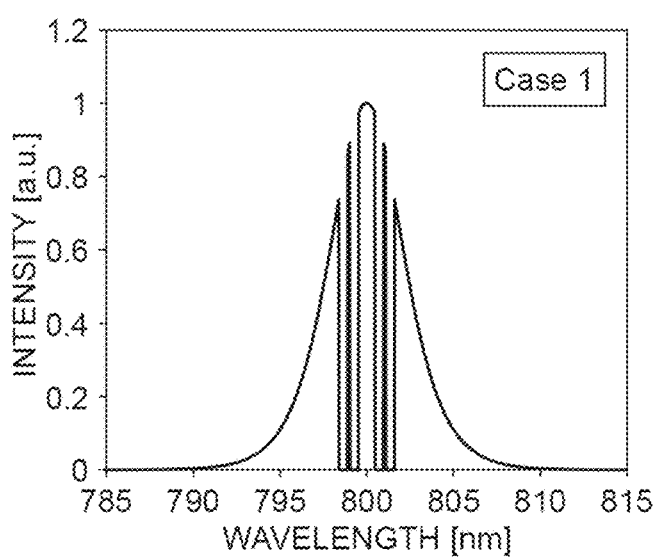
FIG. 23A is a view showing an example of a model of the double mask in a case where the intensity loss rate is set to be constant.
Figure 23B:
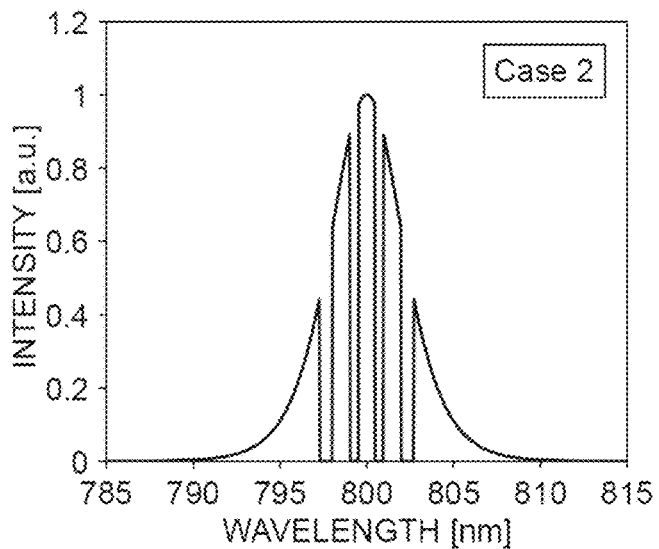
FIG. 23B is a view showing an example of the model of the double mask in a case where the intensity loss rate is set to be constant.
Figure 23C:
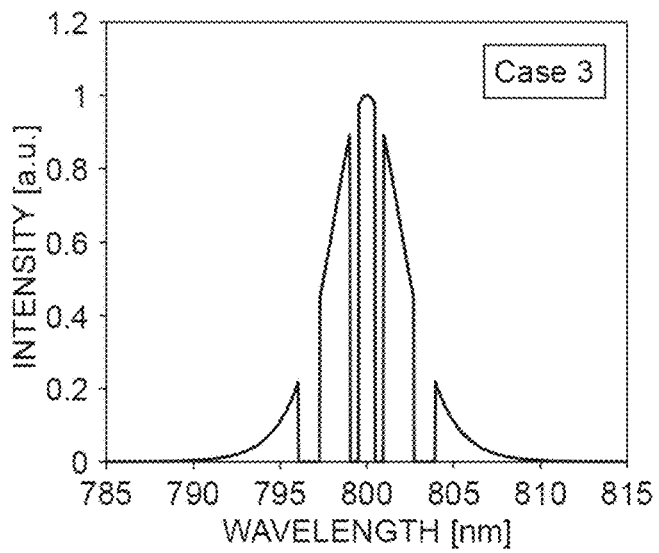
FIG. 23C is a view showing an example of the model of the double mask in a case where the intensity loss rate is set to be constant.

FIG. 23A to FIG. 23C show models of three double masks in which parameters are different from each other. In Case 1, $\lambda r1$ is set to 800.49 nm, W1 is set to 0.49 nm, $\lambda r2$ is set to 801.12 nm, and W2 is set to 0.49 nm. In Case 2, $\lambda r1$ is set to 800.49 nm, W1 is set to 0.49 nm, $\lambda 2$ is set to 802.00 nm, and W2 is set to 0.73 nm. In Case 3, $\lambda r1$ is set to 800.49 nm, W1 is set to 0.49 nm, $\lambda r2$ is set to 802.73 nm, and W2 is set to 1.22 nm.

FIG. 24 is a view showing a temporal waveform of the output light in a case where intensity modulation is performed by using the masks. As shown in the same drawing, in Case 1 to Case 3, the temporal width (full width at half maximum) of the output light is approximately in a range of 116.2 fs to 118.2 fs. The ratio of the peak intensity of the first side lobe to the peak intensity of the main pulse is 1.05% in Case 1, 0.65% in Case 2, and 1.80% in Case 3. In addition, the appearance time of the first side lobe is approximately 300 fs in Case 1, approximately 470 fs in Case 2, and approximately 280 fs in Case 3.

From the results in FIG. 22B and FIG. 24, it can be seen that narrowing of a temporal width that is the same as in the single mask can be realized even in the case of using the multi masks. In addition, at least in a case where the time region is within a range of −1000 fs to 1000 fs, it can be seen that parameters capable of suppressing the peak intensity of the first side lobe exists in the case of using the double masks in comparison to the case of using the single mask. Since the number of parameters is large in the case of using the double masks, the degree of freedom of adjustment of the peak intensity and the appearance time region of the first side lobe is higher in comparison to the case of using the single mask.

1: light shaping device, 3: intensity modulation unit, 4: calculation unit, 11: demultiplexing element, 12: intensity modulation element, 13: multiplexing element, 22: spatial light modulator, 26: shielding plate, 27: dielectric multi-layer film mirror, L1: input light, L2: output light, M: mask.

What is claimed is:

1. A light shaping device comprising:
   an intensity modulator configured to modulate a spectrum intensity of an optical pulse that is input light, and to output the optical pulse of which a temporal width is narrowed as output light,
   wherein the intensity modulator modulates the spectrum intensity of the input light with a mask expressed by a starting end wavelength $\lambda r$ and a wavelength width W from the starting end wavelength $\lambda r$, and
   wherein a transmittance of the input light in a wavelength region of which an intensity is modulated with the mask is 10% or less.

2. The light shaping device according to claim 1,
   wherein the mask is set to be symmetrical with respect to a central wavelength of the input light.

3. The light shaping device according to claim 1, further comprising:
   a calculator configured to calculate setting values of the starting end wavelength $\lambda r$ and the wavelength width W of the mask that is used in the intensity modulator on the basis of an allowable value of at least one of an intensity loss rate and a temporal width narrowing rate of the output light.

4. The light shaping device according to claim 3,
   wherein the calculator calculates the setting values of the starting end wavelength $\lambda r$ and the wavelength width W of the mask that is used in the intensity modulator on the basis of an allowable value of at least one of a peak intensity and an appearance time region of a side lobe of the output light.

5. The light shaping device according to claim 3,
   wherein the calculator calculates a setting number of the mask that is used in the intensity modulation unit on the basis of an allowable value of at least one of the peak intensity and the appearance time region of the side lobe of the output light.

6. The light shaping device according to claim 3,
   wherein the calculator calculates a power magnification of the input light for compensating a peak intensity of the output light on the basis of setting values of the starting end wavelength $\lambda r$ and the wavelength width W of the mask that is used in the intensity modulator unit.

7. The light shaping device according to claim 1,
   wherein the intensity modulator includes,
   a demultiplexing element configured to demultiplex the input light for every wavelength,
   an intensity modulation element configured to cut a predetermined spectrum component in the input light that is demultiplexed by the demultiplexing element, and
   a multiplexing element configured to multiplex spectrum components output from the intensity modulation element.

8. The light shaping device according to claim 7,
   wherein the intensity modulation element is constituted by a spatial light modulator.

9. The light shaping device according to claim 7,
   wherein the intensity modulation element is constituted by a shielding plate.

10. The light shaping device according to claim 7,
    wherein the intensity modulation element is constituted by one or a plurality of dielectric multi-layer film mirrors.

11. The light shaping device according to claim 1,
    wherein the intensity modulator is constituted by one or a plurality of dielectric multi-layer film mirrors.

12. A light shaping method comprising:
    modulating a spectrum intensity of an optical pulse that is input light, and outputting the optical pulse of which a temporal width is narrowed as output light,
    wherein in the modulating, the spectrum intensity of the input light is modulated with a mask expressed by a starting end wavelength $\lambda r$ and a wavelength width W from the starting end wavelength $\lambda r$, and
    wherein a transmittance of the input light in a wavelength region of which an intensity is modulated with the mask is 10% or less.

13. The light shaping method according to claim 12,
    wherein in the modulating, the mask is set to be symmetrical with respect to a central wavelength of the input light.

14. The light shaping method according to claim 12, further comprising:
    calculating setting values of the starting end wavelength $\lambda r$ and the wavelength width W of the mask that is used in the modulating on the basis of an allowable value of at least one of an intensity loss rate and a temporal width narrowing rate of the output light.

15. The light shaping method according to claim 14,
    wherein in the calculating, the setting values of the starting end wavelength $\lambda r$ and the wavelength width W of the mask that is used in the modulating are calculated on the basis of an allowable value of at least one of a peak intensity and an appearance time region of a side lobe of the output light.

16. The light shaping method according to claim 14,
wherein in the calculating, a setting number of the mask that is used in the modulating is calculated on the basis of an allowable value of at least one of the peak intensity and the appearance time region of the side lobe of the output light.

17. The light shaping method according to claim 14,
wherein in the calculating, a power magnification of the input light for compensating a peak intensity of the output light is calculated on the basis of setting values of the starting end wavelength $\lambda r$ and the wavelength width W of the mask that is used in the modulating.

18. The light shaping method according to claim 12,
wherein in the modulating,
the spectrum intensity of the input light is modulated by using a demultiplexing element configured to demultiplex the input light for every wavelength,
an intensity modulation element configured to cut a predetermined spectrum component in the input light that is demultiplexed by the demultiplexing element, and
a multiplexing element configured to multiplex spectrum components output from the intensity modulation element.

19. The light shaping method according to claim 18,
wherein a spatial light modulator is used as the intensity modulation element.

20. The light shaping method according to claim 18,
wherein a shielding plate is used as the intensity modulation element.

21. The light shaping method according to claim 18,
wherein one or a plurality of dielectric multi-layer film mirrors are used as the intensity modulation element.

22. The light shaping method according to claim 12,
wherein in the modulating, the spectrum intensity of the input light is modulated by using one or a plurality of dielectric multi-layer film mirrors.

23. The light shaping device according to claim 1,
wherein the starting end wavelength $\lambda r$ and the wavelength width W of the mask are set such that the central wavelength of the input light is out of a wavelength range of the mask.

24. The light shaping method according to claim 12,
wherein the starting end wavelength $\lambda r$ and the wavelength width W of the mask are set such that the central wavelength of the input light is out of a wavelength range of the mask.

* * * * *